(12) United States Patent
Bansal et al.

(10) Patent No.: US 12,737,565 B2
(45) Date of Patent: Sep. 15, 2026

(54) TRANSLATING SPEECH IN A GENDER-AWARE MANNER

(71) Applicant: Microsoft Technology Licensing, LLC, Redmond, WA (US)

(72) Inventors: Shubham Bansal, Hyderabad (IN); Vikas Joshi, Bengaluru (IN); Rishon Dsouza, Bangalore (IN); Rupeshkumar Rasiklal Mehta, Hyderabad (IN); Harveen Singh Chadha, Bangalore (IN); Arijit Mukherjee, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 18/587,660

(22) Filed: Feb. 26, 2024

(65) Prior Publication Data

US 2025/0272516 A1 Aug. 28, 2025

(51) Int. Cl.

| | |
|---|---|
| ***G06F 40/45*** | (2020.01) |
| ***G06F 40/58*** | (2020.01) |
| ***G10L 15/22*** | (2006.01) |

(52) U.S. Cl.

CPC .............. *G06F 40/58* (2020.01); *G10L 15/22* (2013.01); *G10L 2015/227* (2013.01)

(58) Field of Classification Search

CPC .......... G06F 40/45; G06F 40/47; G06F 40/58; G10L 15/26

See application file for complete search history.

(56) References Cited

U.S. PATENT DOCUMENTS

| | | | | |
|---|---|---|---|---|
| 5,020,021 | A * | 5/1991 | Kaji | G06F 40/268 704/5 |
| 10,007,663 | B2 * | 6/2018 | Waibel | G06F 40/263 |
| 12,254,271 | B1 * | 3/2025 | Norris | G06F 40/30 |

(Continued)

OTHER PUBLICATIONS

Zhang, et al., "Transformer Transducer: A Streamable Speech Recognition Model with Transformer Encoders and RNN-T Loss," arXiv, arXiv:2002.02562v2 [eess.AS], Feb. 14, Feb. 2020, 5 pages.

(Continued)

*Primary Examiner* — Daniel Abebe

(57) ABSTRACT

A technique translates speech in a first language to text in a second language manner in a manner that is appropriate for the gender of the speaker. In some implementations, the technique receives an input setting that specifies one of three translation modes: masculine mode, feminine mode, and auto mode. The first two modes produce translations in masculine and feminine modes by default, respectively, while the auto mode produces translations in forms that are based on the detected characteristics of audio signals. According to some implementations, the technique uses a training framework that automatically converts a corpus of training examples that exhibit gender bias (e.g., a male gender bias) to training examples having a reducing incidence of gender bias. In some implementations, the training framework updates weights of the machine-trained model based on a combination of two loss components: translation loss and gender loss.

20 Claims, 10 Drawing Sheets

ILLUSTRATIVE OPERATION OF THE TRAINING FRAMEWORK 132, 902

PRODUCE FEATURE INFORMATION ASSOCIATED WITH AN AUDIO SIGNAL THAT INCLUDES SPEECH IN A FIRST LANGUAGE. 904

CONVERT THE FEATURE INFORMATION INTO A MODEL-GENERATED SECOND-LANGUAGE TEXTUAL TRANSCRIPT USING A MACHINE-TRAINED MODEL, THE MODEL-GENERATED SECOND-LANGUAGE TEXTUAL TRANSCRIPT BEING EXPRESSED IN A SECOND LANGUAGE THAT IS DIFFERENT THAN THE FIRST LANGUAGE. 906

COMPARE THE MODEL-GENERATED SECOND-LANGUAGE TEXTUAL TRANSCRIPT WITH A GROUND-TRUTH SECOND-LANGUAGE TEXTUAL TRANSCRIPT, TO PRODUCE A TRANSLATION LOSS. 908

CONVERT THE FEATURE INFORMATION ASSOCIATED WITH THE AUDIO SIGNAL INTO A MODEL-GENERATED INPUT GENDER. 910

COMPARE THE MODEL-GENERATED INPUT GENDER WITH A GROUND-TRUTH INPUT GENDER, TO PRODUCE A GENDER LOSS. 912

UPDATE PARAMETERS OF THE MACHINE-TRAINED MODEL BASED ON A COMBINATION OF THE TRANSLATION LOSS AND GENDER LOSS. 914

(56) References Cited

U.S. PATENT DOCUMENTS

| | | | | |
|---|---|---|---|---|
| 2009/0281789 | A1* | 11/2009 | Waibel | G06F 40/40 704/260 |
| 2012/0197629 | A1* | 8/2012 | Nakamura | G10L 15/26 704/E15.003 |
| 2015/0161110 | A1* | 6/2015 | Salz | G06F 3/018 704/3 |
| 2016/0321247 | A1* | 11/2016 | Moussa | G06F 40/58 |
| 2018/0157647 | A1* | 6/2018 | Marwah | G06F 40/51 |
| 2020/0012724 | A1* | 1/2020 | Kawatake | G10L 13/033 |
| 2020/0226327 | A1 | 7/2020 | Evgeny et al. | |
| 2022/0374615 | A1* | 11/2022 | Park | G06F 40/58 |
| 2023/0206011 | A1* | 6/2023 | Golovanov | G06F 40/284 704/2 |

OTHER PUBLICATIONS

Elaraby, et al., “Gender Aware Spoken Language Translation Applied to English-Arabic,” arXiv, arXiv:1802.09287 [cs.CL], Feb. 26, 2018, 11 pages.
Gaido, et al., “Breeding Gender-aware Direct Speech Translation Systems,” in Proceedings of the 28th International Conference on Computational Linguistics, Dec. 2020, pp. 3951-3964.
Tang, et al., “Hybrid Transducer and Attention based Encoder-Decoder Modeling for Speech-to-Text Tasks,” in Proceedings of the 61st Annual Meeting of the Association for Computational Linguistics, vol. 1: Long Papers, Jul. 2023, pp. 12441-12455.
Alastruey, et al., “Efficient Transformer for Direct Speech Translation,” arXiv, arXiv:2107.03069v1 [cs.CL], Jul. 7, 2021, 7 pages.
Latif, et al., “Transformers in Speech Processing: A Survey,” arXiv, arXiv:2303.11607v1 [cs.CL], Mar. 21, 2023, 27 pages.
Di Gangi, et al., “Enhancing Transformer for End-to-end Speech-to-Text Translation,” in Proceedings of Machine Translation Summit XVII: Research Track, European Association for Machine Translation, 2019, pp. 21-31.
Li, et al., “On the Comparison of Popular End-to-End Models for Large Scale Speech Recognition,” arXiv, arXiv:2005.14327v2 [eess.AS], Jul. 30, 2020, 5 pages.
Vaswani, et al., “Attention Is All You Need,” in 31st Conference on Neural Information Processing Systems (NIPS 2017), 2017, 11 pages.
Touvron, et al., “LLaMA: Open and Efficient Foundation Language Models,” arXiv, arXiv:2302.13971v1 [cs.CL], Feb. 27, 2023, 27 pages.
Scao, et al., “BLOOM: A 176B-Parameter Open-Access Multilingual Language Model,” arXiv, arXiv:2211.05100v2 [cs.CL], Dec. 11, 2022, 62 pages.
Bensal, et al., “Addressing speaker gender bias in large scale speech translation systems,” arXiv, arXiv:2501.05989v1 [cs.CL], Jan. 10, 2025, 8 pages.
Li, et al., “Improving RNN Transducer Modeling for End-to-End Speech Recognition,” arXiv, arXiv:1909.12415v1 [cs.CL], Sep. 26, 2019, 8 pages.
Bahdanau, et al., “Neural Machine Translation by Jointly Learning to Align and Translate,” arXiv, arXiv:1409.0473v7 [cs.CL], May 19, 2016, 15 pages.
Stahlberg, Felix, “Neural Machine Translation: A Review,” arXiv:1912.02047v2 [cs.CL], Sep. 29, 2020, 91 pages.
Berard, et al., “End-to-End Automatic Speech Translation of Audiobooks,” arXiv, arXiv:1802.04200v1 [cs.CL], Feb. 12, 2018, 5 pages.
Gaido, et al., “On Knowledge Distillation for Direct Speech Translation,” arXiv, arXiv:2012.04964, arXiv:2012.04964v1 [cs.CL], Dec. 9, 2020, 8 pages.
Xue, et al., “Large-Scale Streaming End-to-End Speech Translation with Neural Transducers,” in Proc. Interspeech 2022, 2022, pp. 3263-3267.
Xu, et al., “Recent Advances in Direct Speech-to-text Translation,” arXiv, arXiv:2306.11646v1 [cs.CL], Jun. 20, 2023, 10 pages.
Gandhare, et al., “Literature Survey: Spoken Language Translation,” available at https://www.cfilt.iitb.ac.in/resources/surveys/Sanket_SurveyPaper_SPKMT.pdf, Computation for Indian Language Technology, 2018, 15 pages.
Bentivogli, et al., “Cascade versus Direct Speech Translation: Do the Differences Still Make a Difference?,” arXiv, arXiv:2106.01045v1 [cs.CL], Jun. 2, 2021, 15 pages.
Etchegoyhen, et al., “Cascade or Direct Speech Translation? A Case Study,” in Applied Sciences, vol. 12, No. 3, 2022, 24 pages.
Koolen, et al., “These are not the Stereotypes You are Looking For: Bias and Fairness in Authorial Gender Attribution,” in Proceedings of the First Ethics in NLP Workshop, Association for Computational Linguistics (ACL), 2017, pp. 12-22.
Sun, et al., “Mitigating Gender Bias in Natural Language Processing: Literature Review,” arXiv, arXiv:1906.08976v1 [cs.CL], Jun. 2019, 11 pages.
Nadeem, et al., “StereoSet: Measuring stereotypical bias in pretrained language models,” arXiv, arXiv:2004.09456v1 [cs.CL], Apr. 20, 2020, 15 pages.
Savoldi, et al., “Gender Bias in Machine Translation,” in Transactions of the Association for Computational Linguistics, vol. 9, 2021, pp. 845-874.
Bentivogli, et al., “Gender in Danger? Evaluating Speech Translation Technology on the MuST-SHE Corpus,” arXiv, arXiv:2006.05754v1 [cs.CL], Jun. 10, 2020, 12 pages.
Jiao, et al., “Is ChatGPT a Good Translator? Yes With GPT-4 as the Engine,” arXiv, arXiv:2301.08745v4 [cs.CL], Nov. 2, 2023, 10 pages.
Tatman, Rachael, “Gender and Dialect Bias in YouTube's Automatic Captions” in Proceedings of the First Workshop on Ethics in Natural Language Processing, Apr. 2017, pp. 53-59.
Bourguignon, et al., “When does it hurt? Intergroup permeability moderates the link between discrimination and self-esteem,” in European Journal of Social Psychology, 2015, only abstract provided, 1 page.
Aristar, Anthony, “Greville Corbett, Gender. (Cambridge Textbooks in Linguistics.) Cambridge: Cambridge University Press, 1991. pp. xix + 363,” in Journal of Linguistics, vol. 28, only p. 542 provided.
Saunders, et al., “Reducing Gender Bias in Neural Machine Translation as a Domain Adaptation Problem,” in Proceedings of the 58th Annual Meeting of the Association for Computational Linguistics, Jul. 2020, pp. 7724-7736.
Saunders, et al., “Neural Machine Translation Doesn't Translate Gender Coreference Right Unless You Make It,” in Proceedings of the Second Workshop on Gender Bias in Natural Language Processing, Dec. 2020, pp. 35-43.
Wang, et al., “Document-Level Machine Translation with Large Language Models,” arXiv:2304.02210v2 [cs.CL], Oct. 24, 2023, 16 pages.
Savoldi, et al., “Test Suites Task: Evaluation of Gender Fairness in MT with MuST-SHE and INES,” arXiv, arXiv:2310.19345v1 [cs.CL], Oct. 30, 2023, 11 pages.
Barrault, et al., “Seamless: Multilingual Expressive and Streaming Speech Translation,” arXiv, arXiv:2312.05187v1 [cs.CL], Nov. 30, 2023, 145 pages.
Di Gangi, et al., “MuST-C: a Multilingual Speech Translation Corpus,” Proceedings of the 2019 Conference of the North American Chapter of the Association for Computational Linguistics: Human Language Technologies, vol. 1 (Long and Short Papers), 2019, pp. 2012-2018.
Kocabiyikoglu, et al., “Augmenting Librispeech with French Translations: A Multimodal Corpus for Direct Speech Translation Evaluation,” arXiv:1802.03142v1 [cs.CL], Feb. 9, 2018 2018, 5 pages.
Touvron, et al., “Llama 2: Open Foundation and Fine-Tuned Chat Models,” arXiv, arXiv:2307.09288v2 [cs.CL], Jul. 19, 2023, first 23 pages.
Achiam, et al., “GPT-4 Technical Report,” arXiv, arXiv:2303.08774v6 [cs.CL], Mar. 4, 2024, 100 pages.
Ma, et al., “Fairness-guided Few-shot Prompting for Large Language Models,” arXiv, arXiv:2303.13217v3 [cs.CL], Mar. 31, 2023, 15 pages.

(56) References Cited

OTHER PUBLICATIONS

Wei, et al., "Chain-of-Thought Prompting Elicits Reasoning in Large Language Models," in Advances in Neural Information Processing, vol. 35, 2022, 14 pages.
Papineni, et al., "BLEU: a Method for Automatic Evaluation of Machine Translation," in ACL '02: Proceedings of the 40th Annual Meeting on Association for Computational Linguistics, 2002, pp. 311-318.
Rastorgueva, et al., "New Standard for Speech Recognition and Translation from the NVIDIA NeMo Canary Model," available at https://developer.nvidia.com/blog/new-standard-for-speech-recognition-and-translation-from-the-nvidia-nemo-canary-model/, NVIDIA, Apr. 18, 2024, 10 pages.
Jia, et al., "Leveraging unsupervised and weakly-supervised data to improve direct speech-to-speech translation," arXiv:2203.13339v2 [cs.CL], Jun. 27, 2022, 7 pages.
Kuczmarski, et al., "Reducing Gender Bias in Google Translate," available at https://blog. Google/products/translate/reducing-gender-bias-google-translate/, Google Blog, Dec. 6, 2018, 3 pages.
Mechura, et al., "10 things you should know about gender bias in machine translation," available at https://www.fairslator.com/10-things-about-gender-bias-in-mt, Fairslator, Mar. 2, 2022, 9 pages.
International Search Report and Written Opinion in PCT Application No. PCT/US2025/010364, mailing date Mar. 28, 2025, 14 pages.

* cited by examiner

SECOND MACHINE-TRAINED MODEL ARCHITECTURE

402 y

TRANSFORMER-BASED ENCODER 404

TRANSFORMER-BASED DECODER 406 x

Figure 7:
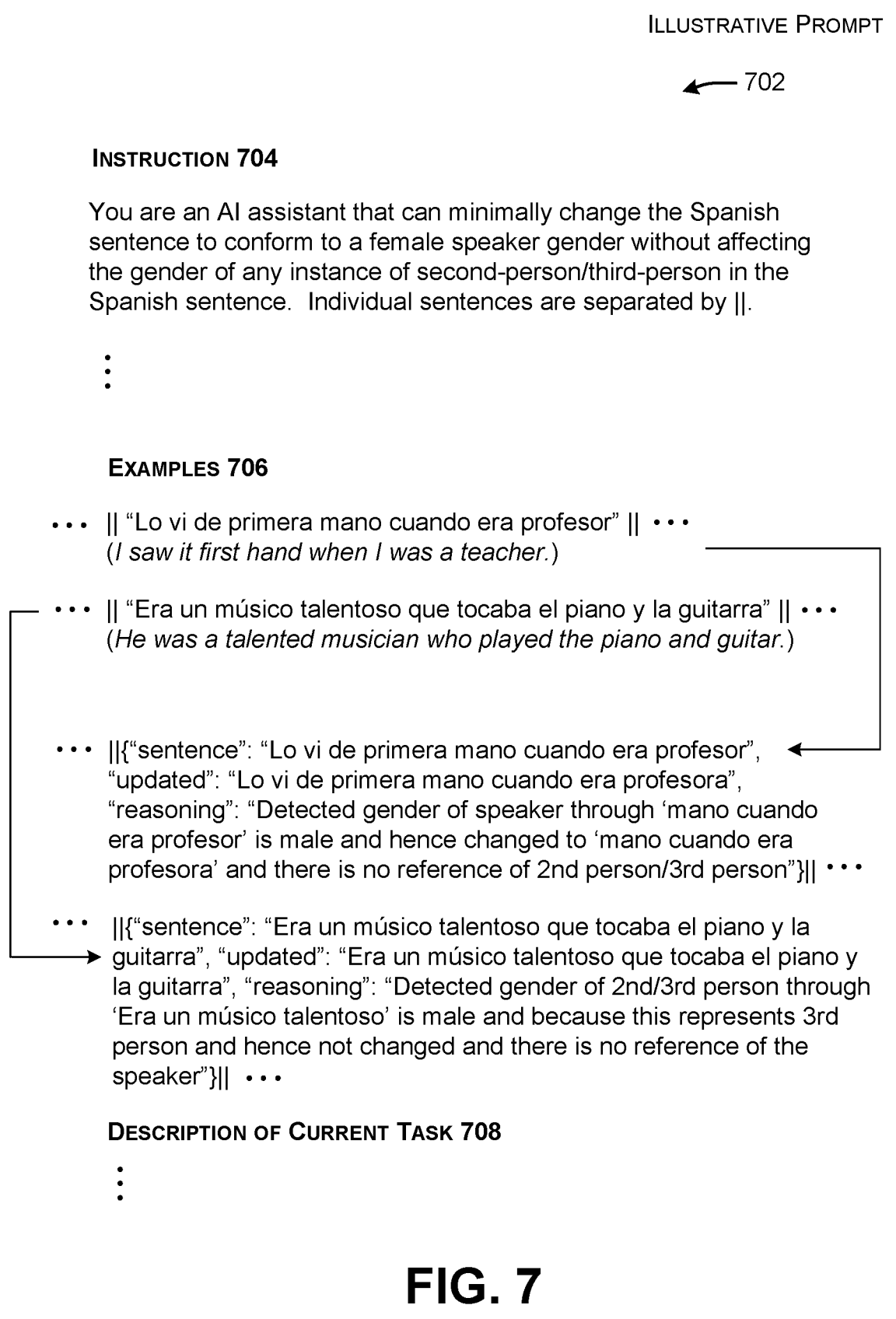

ILLUSTRATIVE PROMPT

702

INSTRUCTION 704

You are an AI assistant that can minimally change the Spanish sentence to conform to a female speaker gender without affecting the gender of any instance of second-person/third-person in the Spanish sentence. Individual sentences are separated by ||.

⋮

EXAMPLES 706

• • • || "Lo vi de primera mano cuando era profesor" || • • •
(*I saw it first hand when I was a teacher.*)

• • • || "Era un músico talentoso que tocaba el piano y la guitarra" || • • •
(*He was a talented musician who played the piano and guitar.*)

• • • ||{"sentence": "Lo vi de primera mano cuando era profesor", "updated": "Lo vi de primera mano cuando era profesora", "reasoning": "Detected gender of speaker through 'mano cuando era profesor' is male and hence changed to 'mano cuando era profesora' and there is no reference of 2nd person/3rd person"}|| • • •

• • • ||{"sentence": "Era un músico talentoso que tocaba el piano y la guitarra", "updated": "Era un músico talentoso que tocaba el piano y la guitarra", "reasoning": "Detected gender of 2nd/3rd person through 'Era un músico talentoso' is male and because this represents 3rd person and hence not changed and there is no reference of the speaker"}|| • • •

DESCRIPTION OF CURRENT TASK 708

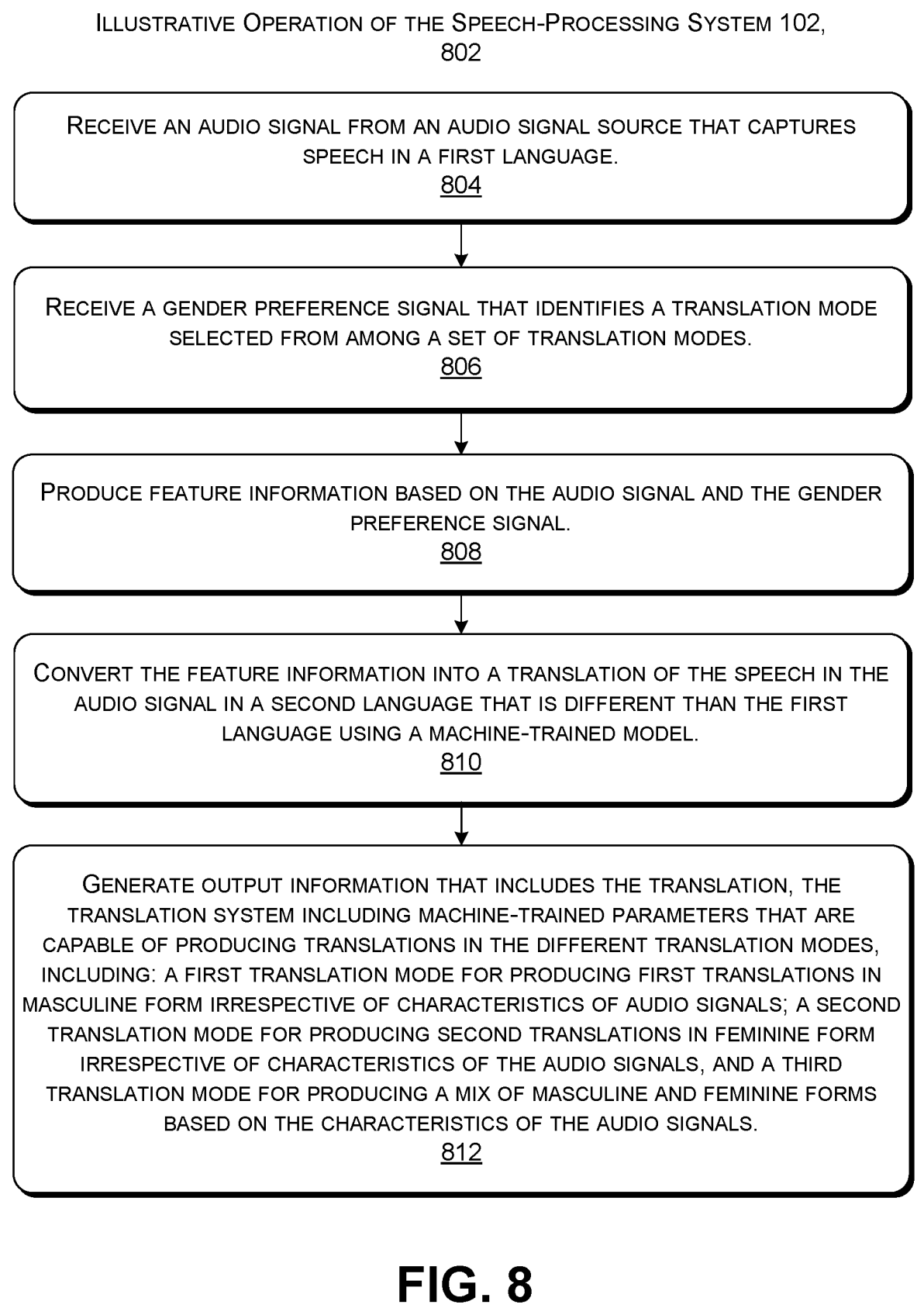

ILLUSTRATIVE OPERATION OF THE SPEECH-PROCESSING SYSTEM 102,
802

RECEIVE AN AUDIO SIGNAL FROM AN AUDIO SIGNAL SOURCE THAT CAPTURES SPEECH IN A FIRST LANGUAGE.
804

RECEIVE A GENDER PREFERENCE SIGNAL THAT IDENTIFIES A TRANSLATION MODE SELECTED FROM AMONG A SET OF TRANSLATION MODES.
806

PRODUCE FEATURE INFORMATION BASED ON THE AUDIO SIGNAL AND THE GENDER PREFERENCE SIGNAL.
808

CONVERT THE FEATURE INFORMATION INTO A TRANSLATION OF THE SPEECH IN THE AUDIO SIGNAL IN A SECOND LANGUAGE THAT IS DIFFERENT THAN THE FIRST LANGUAGE USING A MACHINE-TRAINED MODEL.
810

GENERATE OUTPUT INFORMATION THAT INCLUDES THE TRANSLATION, THE TRANSLATION SYSTEM INCLUDING MACHINE-TRAINED PARAMETERS THAT ARE CAPABLE OF PRODUCING TRANSLATIONS IN THE DIFFERENT TRANSLATION MODES, INCLUDING: A FIRST TRANSLATION MODE FOR PRODUCING FIRST TRANSLATIONS IN MASCULINE FORM IRRESPECTIVE OF CHARACTERISTICS OF AUDIO SIGNALS; A SECOND TRANSLATION MODE FOR PRODUCING SECOND TRANSLATIONS IN FEMININE FORM IRRESPECTIVE OF CHARACTERISTICS OF THE AUDIO SIGNALS, AND A THIRD TRANSLATION MODE FOR PRODUCING A MIX OF MASCULINE AND FEMININE FORMS BASED ON THE CHARACTERISTICS OF THE AUDIO SIGNALS.
812

FIG. 8

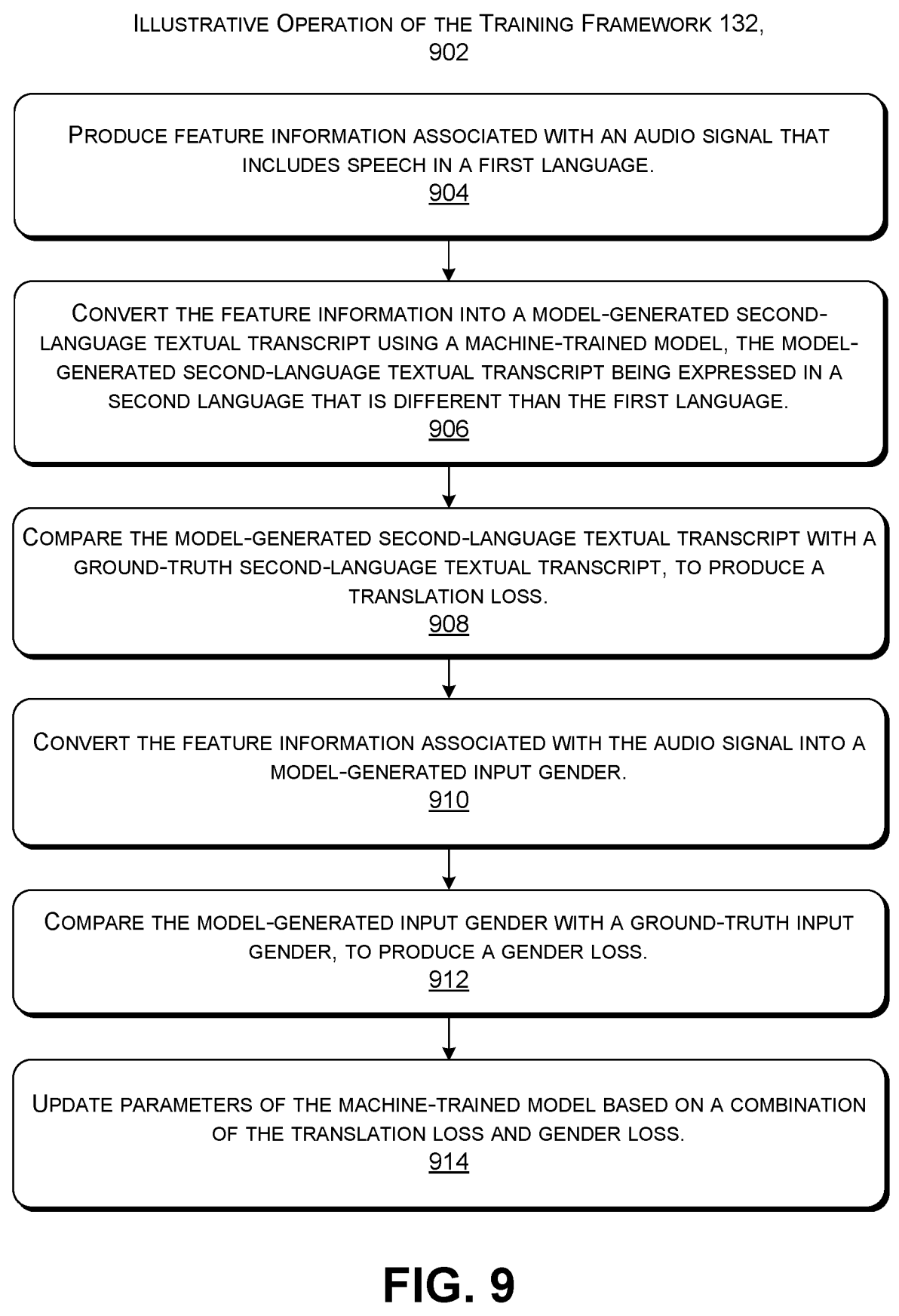

ILLUSTRATIVE OPERATION OF THE TRAINING FRAMEWORK 132,
902

PRODUCE FEATURE INFORMATION ASSOCIATED WITH AN AUDIO SIGNAL THAT INCLUDES SPEECH IN A FIRST LANGUAGE.
904

CONVERT THE FEATURE INFORMATION INTO A MODEL-GENERATED SECOND-LANGUAGE TEXTUAL TRANSCRIPT USING A MACHINE-TRAINED MODEL, THE MODEL-GENERATED SECOND-LANGUAGE TEXTUAL TRANSCRIPT BEING EXPRESSED IN A SECOND LANGUAGE THAT IS DIFFERENT THAN THE FIRST LANGUAGE.
906

COMPARE THE MODEL-GENERATED SECOND-LANGUAGE TEXTUAL TRANSCRIPT WITH A GROUND-TRUTH SECOND-LANGUAGE TEXTUAL TRANSCRIPT, TO PRODUCE A TRANSLATION LOSS.
908

CONVERT THE FEATURE INFORMATION ASSOCIATED WITH THE AUDIO SIGNAL INTO A MODEL-GENERATED INPUT GENDER.
910

COMPARE THE MODEL-GENERATED INPUT GENDER WITH A GROUND-TRUTH INPUT GENDER, TO PRODUCE A GENDER LOSS.
912

UPDATE PARAMETERS OF THE MACHINE-TRAINED MODEL BASED ON A COMBINATION OF THE TRANSLATION LOSS AND GENDER LOSS.
914

FIG. 9

ILLUSTRATIVE OPERATION OF THE TRAINING FRAMEWORK 132,
1002

RECEIVE ORIGINAL TRAINING EXAMPLES THAT INCLUDE AUDIO SIGNALS CONTAINING SPEECH IN A FIRST LANGUAGE, FIRST-LANGUAGE TEXTUAL TRANSCRIPTS OF THE AUDIO SIGNALS, AND SECOND-LANGUAGE TEXTUAL TRANSCRIPTS OF TRANSLATIONS OF THE AUDIO SIGNALS IN A SECOND LANGUAGE THAT IS DIFFERENT THAN THE FIRST LANGUAGE.
1004

PRODUCE CONVERTED TRAINING EXAMPLES BY CORRECTING INSTANCES OF GENDER BIAS IN THE SECOND-LANGUAGE TEXTUAL TRANSCRIPTS OF THE ORIGINAL TRAINING EXAMPLES, THE INSTANCES OF GENDER BIAS HAVING SECOND-LANGUAGE TRANSCRIPTS HAVING GENDER FORMS THAT DO NOT MATCH AUDIO CHARACTERISTICS OF ASSOCIATED AUDIO SIGNALS.
1006

TRAIN PARAMETERS OF THE MACHINE-TRAINED MODEL BASED ON THE CONVERTED TRAINING EXAMPLES.
1008

FIG. 10

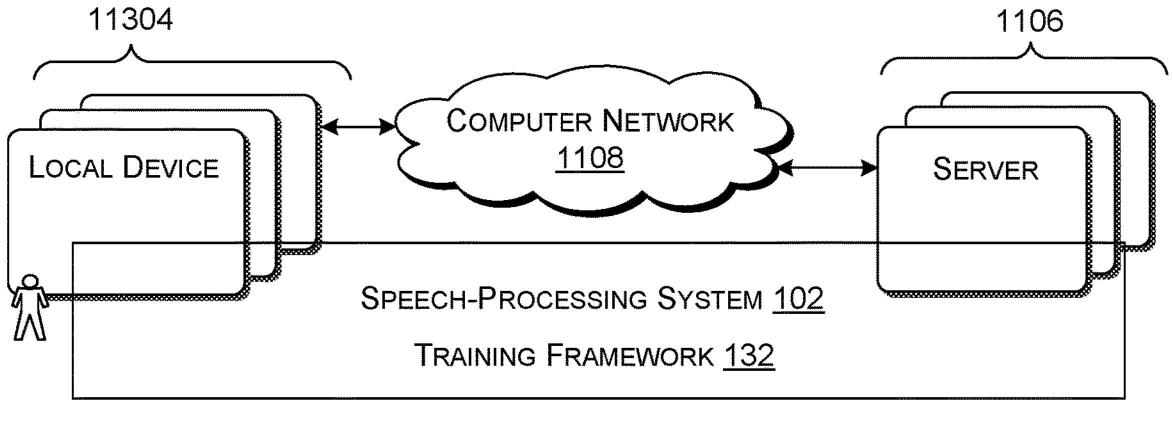

FIG. 11

TRANSLATING SPEECH IN A GENDER-AWARE MANNER

BACKGROUND

Machine-trained models are now available for translating speech expressed in a first language to text or speech expressed in a second language. These kinds of machine-trained models, however, produce output results of uneven quality for different types of speakers.

SUMMARY

Many languages express the same message in different ways depending on the genders of the people who speak the message. Existing machine-trained models do not adequately handle these kinds of complications. A technique is described herein for addressing this shortcoming by translating speech in a first natural language to text in a second natural language in a manner that is appropriate for the gender of the speaker. The gender is either fixed by an input setting (in a masculine or feminine translation mode) or is automatically detected (in an auto translation mode).

According to some implementations, the technique is used to translate speech based on audio signals captured by a microphone. In other implementations, the technique is used to translate speech based on recorded audio content in a media item (e.g., a video item), for instance, for use in producing a close captioned presentation. In either case, the technique is able to produce translations with low latency, enabling the real-time presentation of the translations as speech is captured or streamed.

In some implementations, the technique uses a single end-to-end machine-trained model. The technique is more efficient to develop, maintain, and run compared to hybrid approaches that use a combination of different models. For example, the technique is more efficient than a cascaded approach that uses a speech recognition model in series with a translation model. The technique is also more efficient than a technique that relies on plural models dedicated to different translation modes.

According to some implementations, the technique uses a training framework that automatically converts a corpus of training examples that exhibit gender bias (e.g., a male gender bias) to training examples having a reduced incidence of gender bias. In some implementations, the technique relies on a machine-trained language model to perform its conversion task.

According to some implementations, the training framework updates weights of the machine-trained model based on a combination of two loss components: translation loss and gender loss. Translation loss measures the accuracy of a particular translation relative to a ground-truth translation. Gender loss measures the accuracy of a detected gender relative to a ground-truth gender specification.

The above-summarized technique is technically advantageous because it reduces gender-related artifacts in the course of processing audio signals in a resource-efficient and low-latency manner. In addition to the technical advantages described herein, from a societal perspective, the technique increases inclusion of formerly marginalized groups, including women, people with speech impairments, transgender individuals, etc. The technique performs this task by producing translations that are appropriate for the marginalized groups. The technique also provides mechanisms for empowering members of the marginalized groups to specify their gender preferences.

The above-summarized technology is capable of being manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 7 shows an illustrative prompt produced by a prompt-generating component in the conversion system of FIG. 6.

FIG. 8 is a flowchart that shows an illustrative manner of operation (in the inference stage) of the speech-processing system of FIGS. 1 and 2.

FIG. 9 is a flowchart that shows an illustrative manner of operation of a training system in the training framework of FIG. 5.

FIG. 10 is a flowchart that shows an illustrative manner of operation of the conversion system of FIG. 6.

FIG. 11 shows computing equipment that, in some implementations, is used to implement the speech-processing systems of FIG. 1 and FIG. 2, and the training framework of FIG. 5.

The same numbers are used throughout the disclosure and figures to reference like components and features.

DETAILED DESCRIPTION

Figure 1:
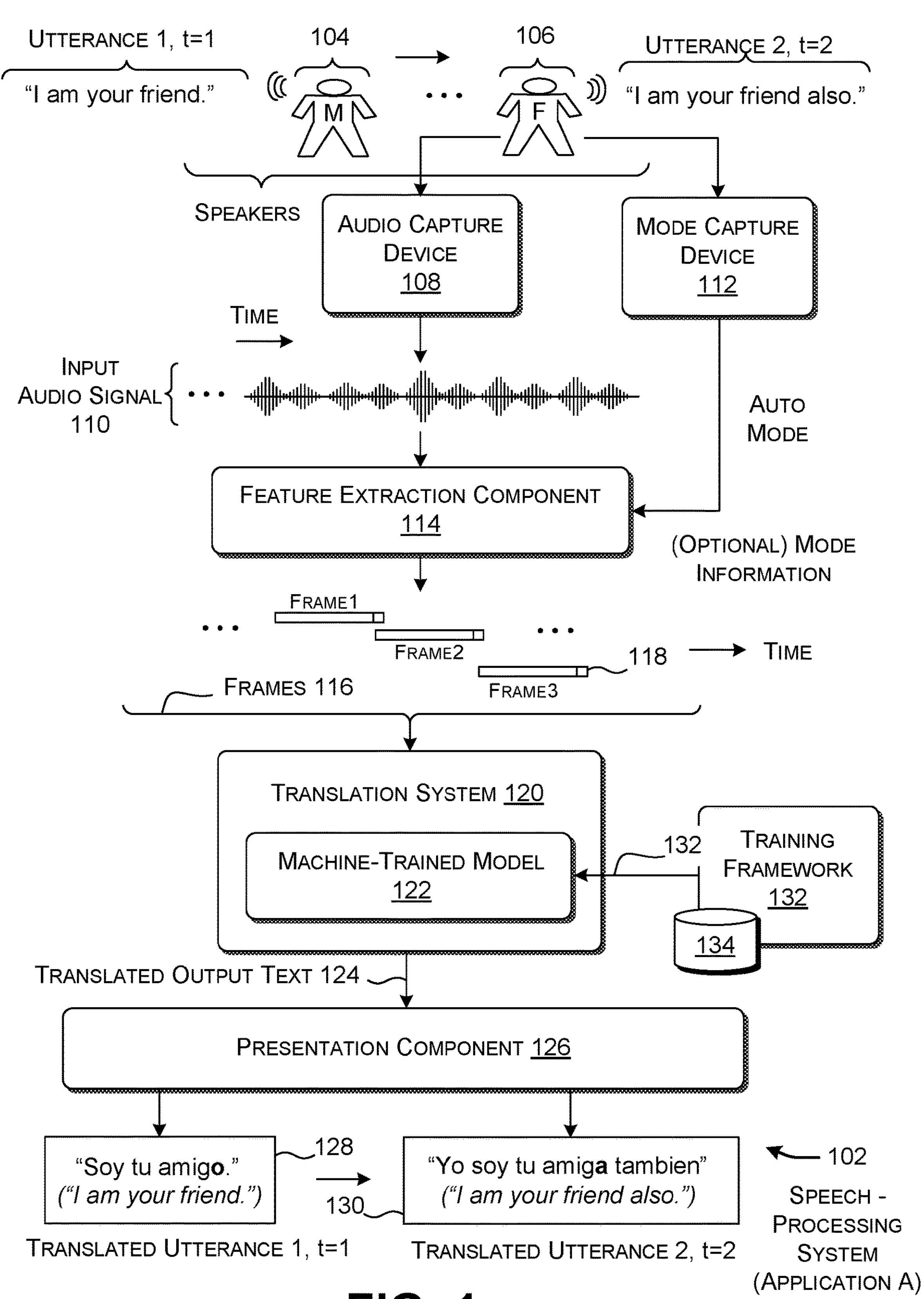
FIG. 1 shows a speech-processing system for translating speech in a first natural language to text in a second natural language.

FIG. 1 shows a speech-processing system 102 for translating speech in a first natural language to text or speech in a second natural language ("first language" and "second language," respectively, henceforth for brevity). In the illustrative application of FIG. 1, a male user 104 is conversing with a female user 106. More specifically, the male user 104 says "I am your friend" in English. A female user 106 responds by saying "I am your friend also" in English. Other scenarios include more than two users or a single user.

The goal of the speech-processing system 102 is to convert user utterances into another language. In the example of FIG. 1, the other language is Spanish. The speech-processing system 102 performs this task in a manner that is sensitive to the gender of the speaker. As an outcome, the speech-processing system 102 will translate "friend" in the first English utterance into "amigo" in the Spanish language (because it is spoken by a male) and "friend" in the second English utterance to "amiga" in the Spanish language (because it is spoken by a female). In contrast, many speech-processing systems exhibit a gender-specific bias that will produce translations in male form even for female speakers. As will be described below, this bias often reflects the fact that the machine-trained models used by these other speech-processing systems are primarily or exclusively trained on examples that use the masculine form of translations.

Spanish is just one example of a language in which the form of words depends on the gender of the speaker and/or other contextual factors. To name a few, French, Italian, German, Russian, Hebrew, and Indian-based languages (e.g., Hindi, etc.) share this linguistic characteristic. Moreover, different languages use different rules to govern how gender affects the form of words. In contrast, the English language primarily expresses the gender of the speaker through the use of pronouns, if at all. These factors make it challenging to automatically produce accurate translations between different pairings of languages.

A separate challenge arises with respect to the accurate translation of speech by speakers having vocal characteristics that differ from most other members of their respective genders. This includes self-identified male speakers having speech with vocal characteristics more commonly associated with females, and self-identified female speakers having speech with vocal characteristics more commonly associated with males. In some cases, these vocal characteristics originate from the unique natural physiology of these individuals. In other cases, the characteristics may be attributed to trauma or exposure to certain environments. Gender identification choices and gender reassignment medical procedures add yet another dimension of complexity to this challenge.

Generally, a speech processing system that fails to produce accurate translations disproportionally affects certain groups, including those groups who may have been historically marginalized. These groups include women, the handicapped, transgender individuals, and so on. This has the effect of extending and exacerbating the bias towards these groups. It also has the effect of producing translations that may confuse consumers of the translations. For example, when used for closed captioning of a video, a gender-inappropriate translation may confuse a consumer of the video as to who is actually speaking in a scene having a mix of people of different genders.

Figure 12:
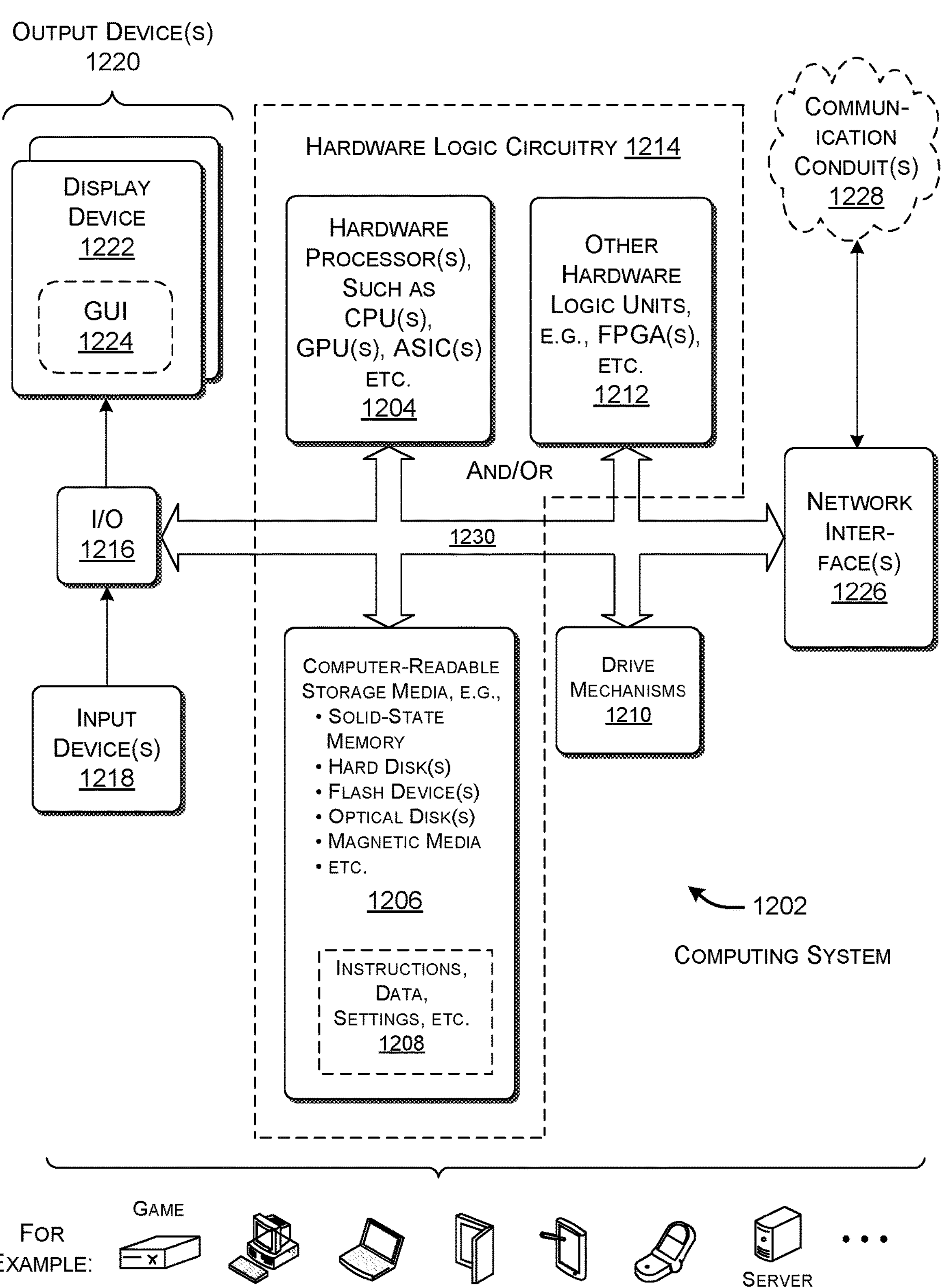
FIG. 12 shows an illustrative type of computing system that, in some implementations, is used to implement any aspect of the features shown in the foregoing drawings.

With the above introduction, the components of the speech-processing system 102 shown in FIG. 1 are set forth below in generally a top-down manner. In some contexts, terms such as "component," "module," "engine," and "tool" refer to parts of computer-based technology that perform respective functions. FIGS. 11 and 12, described below, provide examples of illustrative computing equipment for performing these functions. Gender bias refers to a condition in which decisions are made based on an assumption regarding gender that does not match a gender of a speaker that is considered correct.

At the present time depicted in FIG. 1, an audio capture device 108 captures an audio signal 110 based on the utterance made by the female user 106 ("I am your friend also"). The audio capture device 108 includes one or more microphones. A mode capture device 112 captures a translation mode, selected from among a set of possible translation modes (described below). The mode capture device 112 includes an input capture mechanism, such as a key input device or a speech-enabled input device. For instance, a user may select a translation mode by using a key input device to interact with a user interface configuration presentation. Alternatively, the user may provide a voice command at any time to set a new translation mode.

In the example of FIG. 1, the selected translation mode is the auto mode. In this mode, the speech-processing system 102 automatically interprets the gender of each instance of speech based on the audio signals being received at the current time, and translates the speech in accordance with the detected gender (that is, by producing masculine form translations for male speakers and feminine translations for female speakers). A masculine translation mode produces translations in masculine form irrespective of the characteristics of the input audio signals. A feminine translation mode produces translations in feminine form irrespective of the characteristics of the input audio signals. The masculine and feminine modes empower users to dictate the preferred form in which translations are produced. This eliminates the risk that the speech-translation system 102 will produce gender-inappropriate translations. Any user may choose to invoke the masculine mode or feminine mode for any number of reasons, but it is particularly valuable to those having anomalous vocal characteristics.

A feature extraction component 114 produces feature information that expresses the audio signal 110 and the selected translation mode. In some implementations, the feature information includes any combination of Mel-frequency cepstrum coefficients (MFCCs), pitch information, time-domain information, frequency-domain information, etc. In some implementations, the feature information is expressed as a series of frames 116. Each frame includes a first set of features that describe the audio characteristics of the audio signal 110 within a small window of time, and a second set of features that describe the translation mode that applies with respect to this window of time. Feature information 118 is one example of the second set of features. In one illustrative implementation, the first set of features has eighty dimensions, while the second set of features is a code expressed in three dimensions; in whole, the feature information for the frame has a total of 83 dimensions.

A translation system 120 uses a machine-trained model 122 to convert the feature information into translated output text 124 in the second language (here, the Spanish language). In some implementations, the machine-trained model 122 is a sequence-to-sequence model that includes an encoder and a decoder. The encoder transforms the feature information into hidden state information. The decoder relies on the hidden state information to produce the output text 124. Examples of this kind of machine-trained model are described below with reference to FIGS. 3 and 4.

In some implementations, the machine-trained model 122 is a single end-to-end model that directly transforms the feature information into the output text 124. In other implementations, the machine-trained model 122 is an end-to-end model that directly transforms the frame information into a second-language audio signal that expresses the translation, rather than the output text 124. In other implementations, the machine-trained model 122 performs the functions described above in a cascaded fashion using two or more models, such as a first model that converts the feature information to text in the first language (e.g., English), and a second model that converts the text in the first language to text in the second language (e.g., Spanish). In other implementations, the machine-trained model 122 uses an architecture other than an encoder-decoder architecture. Other implementations combine two or more of the variations set forth above.

A presentation component 126 produces output information based on the output text 124 in the second language. For example, the presentation component 126 produces a graphical user interface presentation for presentation on a display device (not shown). The graphical user interface presentation displays the output text 124 in the second language. In other implementations, the presentation component 126 converts the output text 124 in the second language to an audio form, and presents the resulting audio signal to a consuming user via a speaker system (not shown).

In the particular example of FIG. 1, the speech-processing system 102 translates the utterance of the male user 104 ("I am your friend") into "Soy tu amigo" in the Spanish language, and presents this translation on any type of presentation 128. The speech-processing system 102 translates the utterance of the female user 106 ("I am your friend also") into "Yo soy tu amiga tambien" in the Spanish language, and presents this translation via any type of presentation 130. "Amigo" and "amiga" are words that reflect the respective genders of the speakers. In whole, the speech-processing system 102 reduces the occurrence of gender-related artifacts in the translation of speech.

Any application is capable of leveraging the above-described functionality. These applications include transcription systems, media-editing systems, real-time translation aids (e.g., for translating a conference attendee's speech for the benefit of other attendees who speak a different language), and so on.

Finally, a training framework 132 performs training on a set of training examples in a data store 134, to produce the machine-trained model 122. As will be described more fully below in the context of FIGS. 5-7, the training framework 132 first converts an original set of training examples having gender bias to converted training example having a reduced incidence of bias. The training framework 132 then iteratively updates the weights of the machine-trained model 122 based on the converted training examples. In doing so, the training framework 132 computes loss that represents a combination of translation loss and gender loss (described below).

Figure 2:
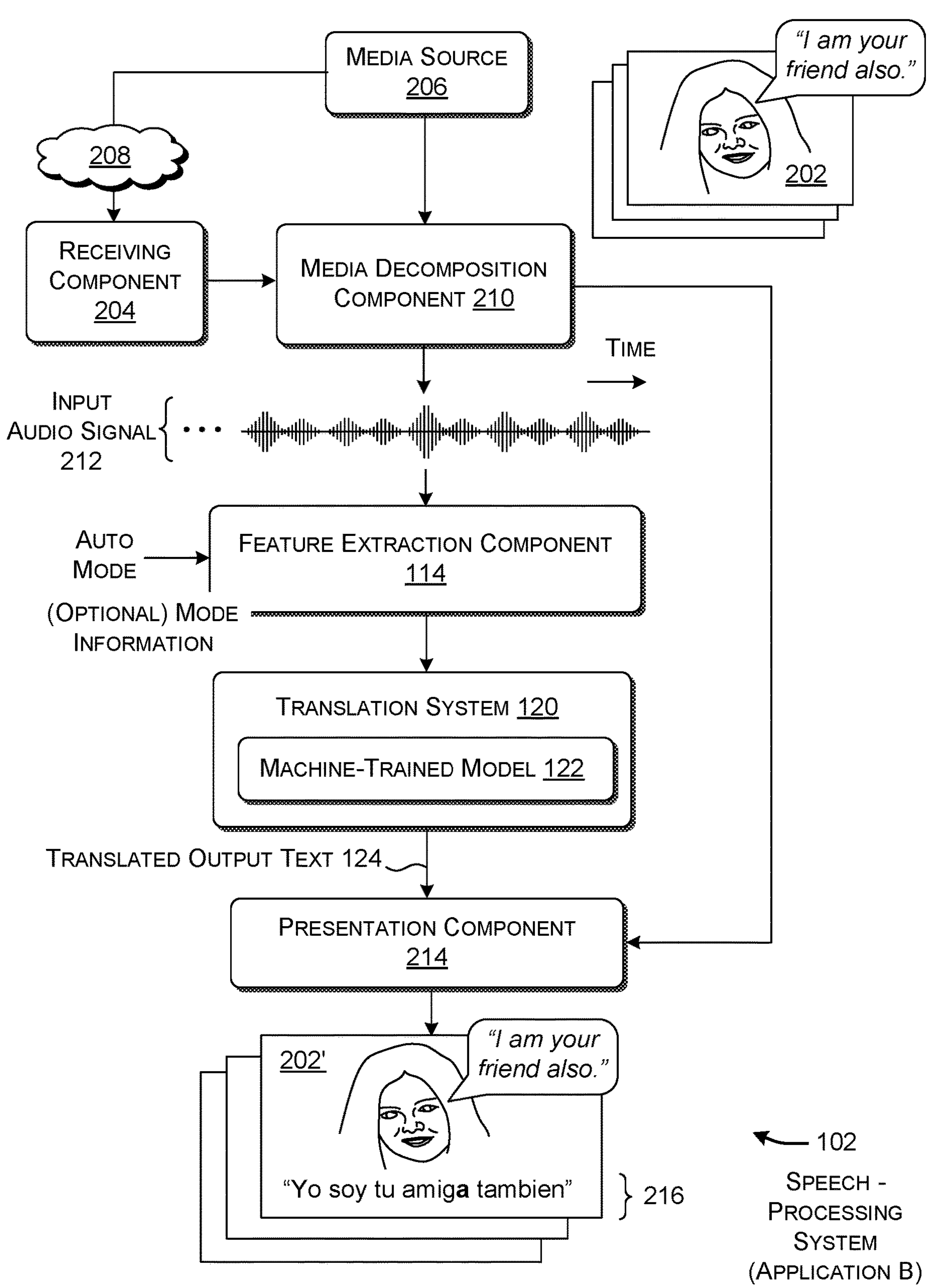
FIG. 2 shows the application of the speech-processing system of FIG. 1 to producing captions in a media item.

FIG. 2 shows an application of the speech-processing system of FIG. 1 that involves converting recorded audio content in a media item from a first language (such as English) to text (or speech) in a second language (such as Spanish). That is, the media item includes only audio content or audio content combined with one or more other types of content, or some other manifestation of the audio content. In the particular example shown in FIG. 2, an illustrative media item 202 is a movie or video or other kind of audio-visual content that includes visual content combined with audio content expressed in the first language (e.g., English). Here, the goal of the speech-processing system 102 is to add closed captioning to the media item 202 that provides a translation of the speech in the media item 202 in the second language (e.g., Spanish). More specifically, a female character in the media item 202 speaks the sentence "I am your friend also." The speech-processing system 102 translates this sentence into Spanish in a gender-appropriate manner. (Note that FIG. 2 shows a simplified representation in which the utterance "I am your friend also" is associated with a single frame of the media item 202, but it is actually represented by audio information that is distributed over plural successive frames.)

The speech-processing system 102 uses a receiving component 204 to receive the media item 202 from any local or remote media source 206. For instance, assume that the speech-processing system 102 is implemented by a local computing device, such as any type of user computing device. Here, the receiving component 204 retrieves the media item 202 from a local data store of the computing device. In another example, the receiving component 204 retrieves the media item 202 from a remote data store (e.g., provided a remote server system) via a wide area network 208. More specifically, in some implementations, the receiving component 204 retrieves and presents the media item 202 in a streaming mode. Regardless of the source of the media item 202, upon its receipt, a media decomposition component 210 extracts an audio signal 212 from the media item 202.

The feature extraction component 114 generates feature information that expresses the audio signal 212 and a selected translation mode. The translation system 120 uses the machine-trained model 122 to translate the feature information to output text 124 (or speech) in the second language (here, Spanish). The feature extraction component 114, translation system 120, and machine-trained model 122 function in the same manner described above with reference to FIG. 1.

A presentation component 214 produces a media item 202' which is the modified counterpart of the media item 202 received by the receiving component 204. More specifically, FIG. 2 shows the case in which the presentation component 214 combines the output text 124 with the visual information in the media item 202. The presentation component 214 expresses the output text 124 as a caption 216 that appears below the visual information, reading "Yo soy tu amiga tranbien." The word "amiga" appropriately has a feminine form because the character in the media item 202 that is speaking at the present moment is a woman.

In both the examples of FIG. 1, the machine-trained model 122 translates the audio signals with low latency. This allows the speech-processing system 102 to presents translations of audio signals in real time, e.g., as the audio signals are captured by the audio capture device 108 (in FIG. 1) or received via streaming by the receiving component 204 (in FIG. 2). In the case of FIG. 2, the machine-trained model 122 enables the playback of the media item 202 without encountering momentary temporal snags, e.g., in which the real-time playback of the media item is temporally paused for "frozen."

Figures 3, 4:
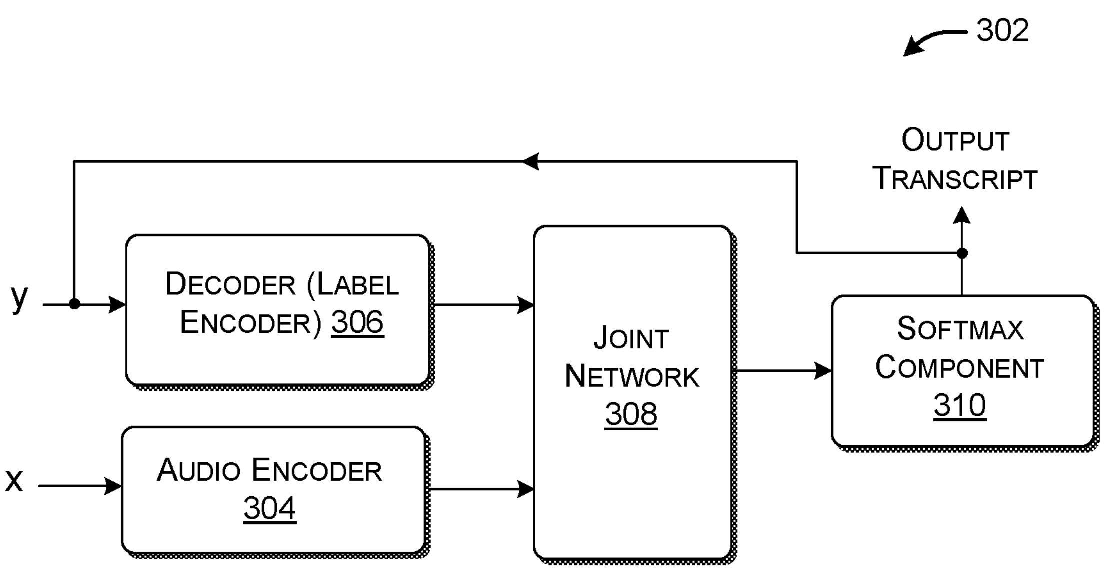
FIG. 3 shows an implementation of a machine-trained model, for use in the speech-processing system of FIGS. 1 and 2, that uses an RNN-T architecture.
FIG. 4 shows an implementation of a machine-trained model, for use in the speech-processing system of FIGS. 1 and 2, that uses a transformer-based encoder-decoder architecture.

FIG. 3 shows a machine-trained model 302 that represents a first implementation of the machine-trained model 122 introduced in the context of FIGS. 1 and 2. The machine-trained model 302 uses an RNN-T architecture. An audio encoder 304 transforms input feature information (produced by the feature extraction component 114) into encoder output information. The feature information expresses speech and a selected translation mode. A decoder (also referred to a label encoder) 306 auto-regressively transforms labels produced by the machine-trained model 302 into decoder output information. "Auto-regressively" means that output produced by the machine-trained model 302 is fed back to the decoder 306 as it is produced, where it serves as new input to the decoder 306. A joint network 308 combines (e.g., adds) the encoder output information to the decoder output information, to produce joint information. A softmax component 310 (also referred to as a normalized exponential function) transforms the joint information into probability information that represents text (or speech) in the second language.

In some implementations, the audio encoder 304 and the decoder 306 are implemented by respective neural networks. The neural networks are implemented as recurrent neural networks (RNNs), long short-term memory (LSTM) networks (which can be used as components in RNNs), transformer networks, convolutional neural networks (CNNs), feed-forward neural networks (FNNs), etc., or any combination thereof.

FIG. 4 shows a machine-trained model 402 that represents a second implementation of the machine-trained model 122 introduced in the context of FIGS. 1 and 2. The machine-trained model 402 uses transformer-based technology. More specifically, a transformer-based encoder 404 transforms input feature information into encoder output information. The feature information expresses speech and a selected translation mode. A transformer-based decoder 406 auto-regressively transforms the encoder output information into text (or speech) in the second language.

Each transformer-based component is a neural network that uses one or more attention components (not shown). An attention component determines how much emphasis should be placed on parts of input information when interpreting other parts of the input information. Consider, for example, a sentence that reads: "I asked the professor a question, but he could not answer it." When interpreting the word "it," the attention component will determine how much weight or emphasis should be placed on each of the words of the sentence. The attention component will find that the word "question" is most significant.

The attention component performs attention analysis using the following equation:

$$\text{Attention}(Q, K, V) = \text{softmax}\left(\frac{QK^T}{\sqrt{d_k}}\right)V. \tag{1}$$

The attention component produces query information Q by multiplying position-supplemented embedding vectors by a query weighting matrix $W^Q$. Similarly, the attention component produces key information K and value information V by multiplying the position-supplemented embedding vectors by a key weighting matrix $W^K$ and a value weighting matrix $W^V$, respectively. To execute Equation (1), the attention component takes the dot product of Q with the transpose of K, and then divides the dot product by a scaling factor $\sqrt{d}$, to produce a scaled result. The symbol d represents the dimensionality of Q and K. The attention component takes the softmax (normalized exponential function) of the scaled result, and then multiplies the result of the softmax operation by V, to produce attention output information. In the context of FIG. 4, the encoder output information includes K and V information that is fed into the transformer-based decoder 406.

Background information on the general topic of end-to-end speech recognition technology can be found in Latif, et al., "Transformers in Speech Processing: A Survey," arXiv, arXiv: 2303.11607v1 [cs.CL], Mar. 21, 2023, 27 pages, and Li, et al., "On the Comparison of Popular End-to-End Models for Large Scale Speech Recognition," arXiv, arXiv: 2005.14327v2 [eess.AS], Jul. 30, 2020, 5 pages. Background information on the general topic of the transformer-based RNN-T architecture can be found in Zhang, et al., "Transformer Transducer: A Streamable Speech Recognition Model with Transformer Encoders and RNN-T Loss," arXiv, arXiv: 2002.02562v2 [eess.AS], Feb. 14, 2020, 5 pages. Background information on the general topic of the transformer architecture and attention can be found in Vaswani, et al., "Attention Is All You Need," in 31st Conference on Neural Information Processing Systems (NIPS 2017), 2017, 11 pages.

The types of unified end-to-end machine-trained models described in FIGS. 1-4 are more efficient than alternative machine-trained models that use plural sub-models devoted to different subtasks. For example, the machine-trained models of FIGS. 1-4 are more efficient than cascaded models that use of a voice recognition model in series with a translation model. The machine-trained models of FIGS. 1-4 are also more efficient than hybrid models that include dedicated sub-models that produce translations for different respective input conditions. Generally, increasing the number of sub-models in a model increases the use of resources by the model, increases the inference-stage latency of the model, increases the complexity and time required to develop and maintain the model, and increases the possibility that the model may fail.

Figure 5:
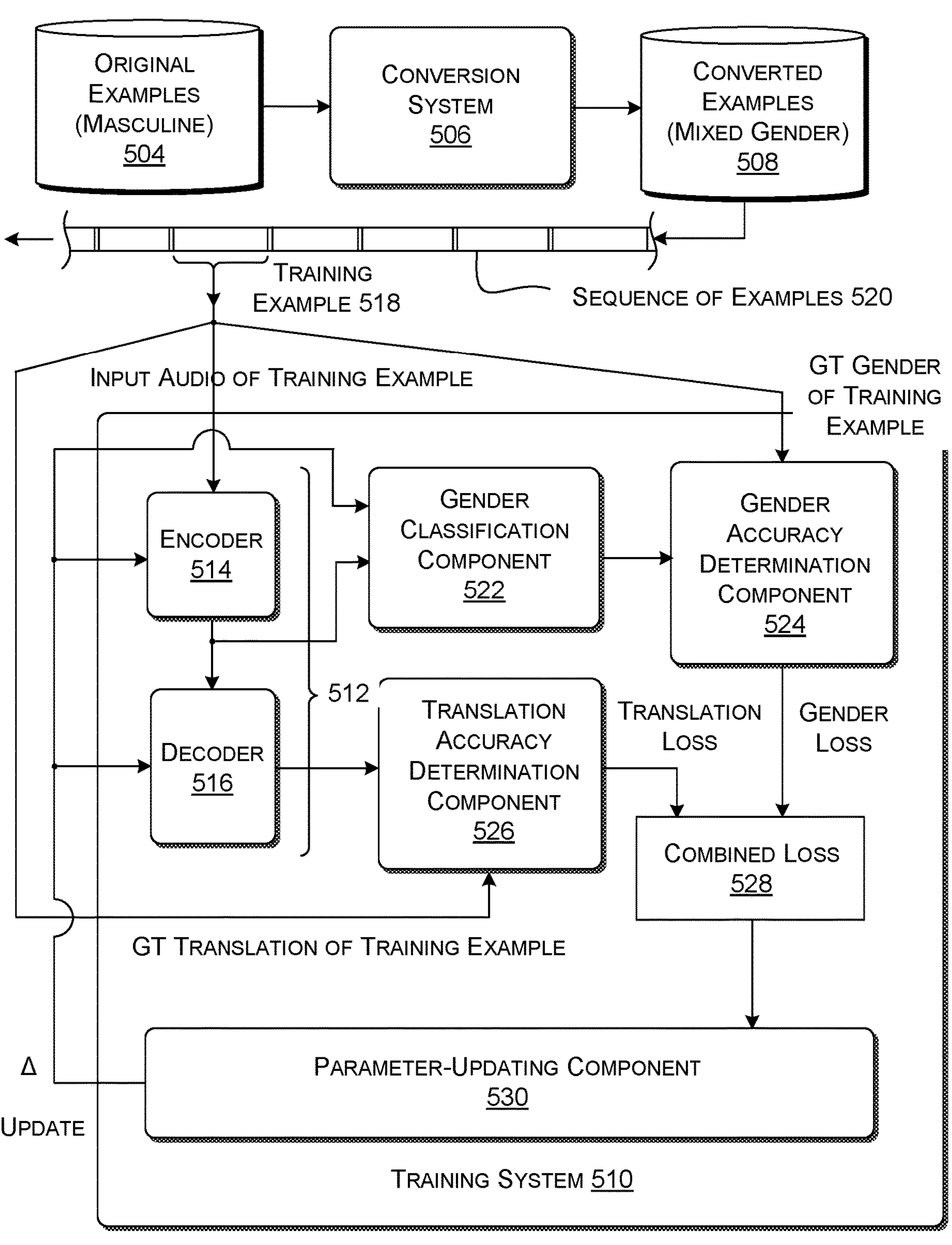
FIG. 5 shows a training framework for training a machine-trained model for use in the speech-processing system of FIGS. 1 and 2.

FIG. 5 shows one implementation of the training framework 132 introduced in FIG. 1. The training framework 132 serves the role of training the machine-trained model 122 used in the speech-processing system 102 of FIGS. 1 and 2. As a preliminary operation, a conversion system 506 corrects instances of gender bias in original training examples in a data store 504 to produce converted training examples, which are stored in a data store 508. More specifically, in many cases, the original training examples inaccurately translate speech that originates from female speakers using a masculine form. The conversion system 506 corrects these training examples by producing appropriate translations in female form. Additional details will be provided below regarding the operation of the conversion system 506 with reference to FIGS. 6 and 7.

A training system 510 iteratively updates the parameters of a machine-trained model 512 based on the converted training examples in the data store 508. The machine-trained model 512 includes an encoder 514 and a decoder 516. The machine-trained model 512, when trained, constitutes the machine-trained model 122 used in the production stage. Two examples of the machine-trained model 512 are provided above with reference to FIGS. 3 and 4. Although not shown, the decoder 516 also includes post-processing functionality for converting hidden state information into logits (e.g., using a linear layer), and converting the logits into final output (e.g., text) in the second natural language (e.g., using a softmax layer).

FIG. 5 illustrates training performed on an illustrative converted trained example 518. The training example 518 includes at least: a first-language audio signal that expresses speech in a first language, a ground-truth (GT) indication of the gender of the speaker associated with the audio signal, and a ground-truth (GT) second-language translation of the audio signal in a second language, expressed in textual form. The qualifier "ground-truth" or "GT" applied to any label means that the label is considered by default to be correct.

In some implementations, the training system 510 performs training on a series of training examples 520. The series mixes together training examples pertaining to different kinds of speakers. For example, the series of training examples 520 intersperses training examples having audio signals produced by male speakers with training examples having audio signals produced by female speakers. Further, the series of training examples 520 includes brief pauses interjected between consecutive audio samples of different random lengths, e.g., to simulate the characteristics of a conversation between two or more people. Note that the while FIG. 5 is explained in the context of processing only one of these training examples, the training system 510 is able to process a batch of these training examples in parallel.

The encoder 514 transforms feature information associated with the audio signal (associated with the training example 518) into encoder output information. The decoder 516 produces decoder output information based, in part, on the encoder output information. A gender classification component 522 classifies the most likely gender of the speaker associated with the audio signal in the training example 518 based, at least in part, on the encoder output information. The gender classification component 522 is implemented using any type of machine-trained model, including a feed-forward model of any type (e.g., a fully-connected feed-forward neural network having any number of layers), a convolutional neural network model, a transformer-based model (e.g., a BERT-type transformer mode), a linear regression model, and so on.

A gender accuracy determination component 524 compares the detected gender (produced by the gender classification model 522) and the ground-truth gender identified by the training example 518, to provide a measure of gender loss with respect to the individual training example 518. Overall, the gender accuracy determination component 524 uses any loss function to produce a measure of gender loss for all of the training examples in a batch, such as cross entropy. A translation accuracy determination component 526 compares the decoder output information with the ground-truth second-language translation provided by the training example 518, to provide a measure of translation loss with respect to the individual training example 518. Overall, the translation accuracy determination component 526 uses any loss function to produce a measure of translation loss for all the training examples in a batch, such as RNN-T loss (which is appropriate for the example of FIG. 3) or cross entropy (which is appropriate for the example of FIG. 4).

The training system 510 produces a combined loss 528 based on a weighted sum of the translation loss and the gender loss (e.g., in which the translation loss is modified by a weight of 0.9, and the gender loss is modified by a weight of 0.1). However, the training system 510 only takes into a consideration the gender loss for the case in which the training example 518 is associated with the auto mode (in which the machine-trained model 512 is tasked with the responsibility of detecting the gender of the speaker). That is, the training system 510 does not consider the gender loss for the masculine translation mode or the feminine translation mode because, in those modes, the gender of the speaker is considered by default to be fixed as masculine or feminine, respectively; training in those cases is based on the translation loss. In the case of the auto mode, by learning to correctly predict the gender of the speaker, the machine-trained model 512 also increases the accuracy at which it produces translations. This is because knowledge of the gender of the speaker contributes to the production of a translation that is accurate for that gender.

A parameter-updating component 530 uses the combined loss 528 to correct the weights of the machine-trained model 512. In some implementations, the parameter-updating component 530 performs this task using stochastic gradient descent in combination with back propagation. The training system 510 also updates the parameters of the gender classification component 522 (in the auto mode) based on the combined loss (as shown in FIG. 5). Note, however, that, in many implementations, the trained gender classification component 522 is not part of the integrated machine-trained model 122 that is used in the inference stage; rather, it serves a support role in the training of the machine-trained model 512. In other implementations, the gender classification component 522 is included in the machine-trained model 122. Here, downstream applications can use or ignore the output of the gender classification component 522, depending on the respective functions performed by the applications.

Figure 6:
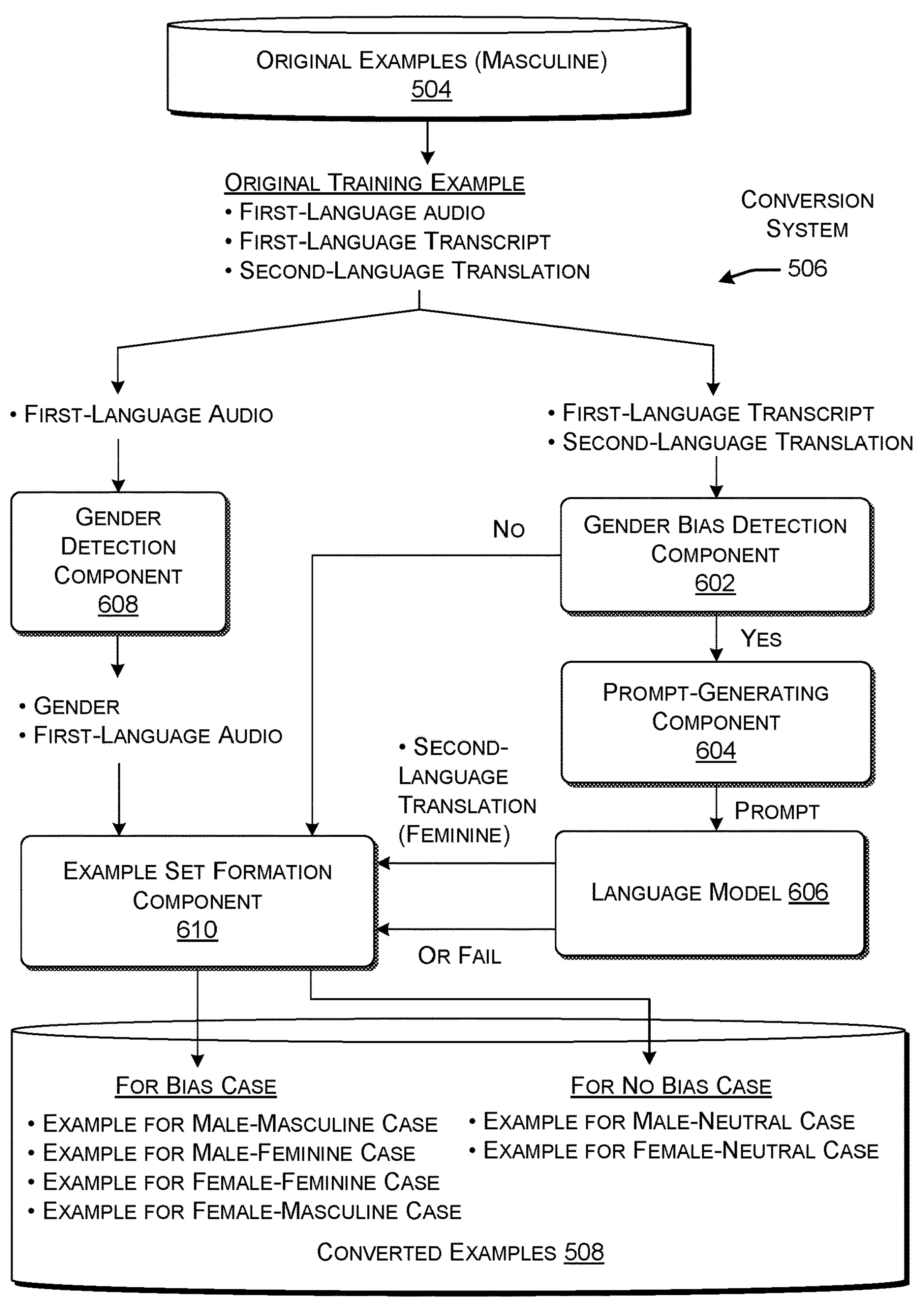
FIG. 6 shows a conversion system for reducing gender bias in a corpus of original training examples in the training framework of FIG. 5.

FIG. 6 shows one manner of operation of the conversion system 506 of FIG. 5. The conversion system 506 corrects instances of gender bias in original training examples in a data store 504. It stores the converted examples (with corrected translations) in a data store 508. In general, the conversion system 506 produces a large quality of gender-appropriate training examples in a resource-efficient and time-efficient manner by correcting errors in an existing corpus of training examples, as opposed to creating new training examples from "scratch."

The conversion system 506 will be explained with respect to a single original training example extracted from the data store 504, although the conversion system 506 is able to automatically process plural original training examples at the same time (e.g., in parallel). The original training example includes plural parts, including: a first-language audio signal that provides speech in the first language (e.g., English); a first-language transcript of the audio signal in the first language; and a second-language transcript of the translation of the audio signal in the second language (e.g., Spanish).

A gender bias detection component 602 determines whether there is a potential that the training example exhibits gender bias. In some implementations, the gender bias detection component 602 performs this task by applying a set of rules. For example, one rule flags the training example as potentially subject to gender bias if the first-language transcript contains a first-language pronoun. This is the case for the examples of FIG. 1 because the sentence "I am your friend" and the sentence "I am your friend also" contain the first-person pronoun "I". Other implementations use a dedicated machine-trained model to perform this task, such as any of a convolutional neural network, a transformer-based network, a feed-forward neural network, or any combination thereof. In general, the task of detecting whether the training example includes the potential for bias is less complex than the task of actually correcting that bias (which is performed in a subsequent stage). Thus, the conversion system 506 devotes a relatively small engine or model to perform this task that is resource-efficient and has low latency and low cost, at least compared to the model that actually corrects the gender bias.

Assume that the gender bias detection component 602 concludes that the training example is capable of gender bias. "Being capable" of gender bias means that there is a prescribed likelihood that gender bias may arise from translation of speech under consideration, as assessed by the gender bias detection component 602. If so, a prompt-generating component 604 produces a prompt, which it subsequently feeds to a language model 606. A prompt includes plural parts. A first part describes the basic task that the language model 606 is being asked to perform. A second part optionally provides one or more examples of how to correctly perform the task. A third part provides information regarding the training example under consideration, such as the first-language transcript and optionally the second-language transcript of the training example.

More generally, a "prompt" refers to a sequence of tokens submitted to a machine-trained model. A "token" refers to a unit of information processed by a machine-trained model, such as a word or a part of a word. In some cases, a tokenizer produces the tokens, but an item (e.g., a text passage) is said to be composed of tokens in a general sense (in which "token" is a synonym of "part"), irrespective of when and where those tokens are actually produced. Additional details regarding an illustrative prompt are set forth below with reference to FIG. 7.

A "language model" refers to a model that, in the present context, functions as a pattern completion engine. The pattern completion engine includes weights that reflect statistical patterns that have been learned by performing training on a typically large collection of training examples. In an auto-regressive mode of operation, given a set of input tokens, the pattern completion engine predicts a next token that is most likely to follow the input tokens. The pattern completion engine then adds the predicted token to the end of the input tokens, to produce an updated set of input tokens, and then repeats its analysis for the updated set of tokens. This process continues until the pattern completion engine predicts a stop token, which is a signal that the auto-regression operation should terminate.

In some implementations, the language model 606 is a pre-trained transformer-based language model, or is produced by fine-tuning such a pre-trained model. One example of a publicly-available pre-trained language model is described in Touvron, et al., "LLaMA: Open and Efficient Foundation Language Models," arXiv, arXiv: 2302.13971v1 [cs.CL], Feb. 27, 2023, 27 pages. Another example of a publicly-available pre-trained model language model is the BLOOM model described in Scao, et al., "BLOOM: A 176B-Parameter Open-Access Multilingual Language Model," arXiv, arXiv: 2211.05100v2 [cs.CL], Dec. 11, 2022, 62 pages. An example of a commercially available language model is any of the GPT family of language models available from OpenAI of San Francisco, California. One such member of the GPT family is the ChatGPT language model.

Consider the specific example in which it is assumed, by default, that a training example that exhibits gender bias does so by including the male form of translation (even for those cases in which it is appropriate to generate feminine-form translations). Here, the language model 606 produces a response that reflects one of two possible outcomes. In a first case, the language model 606 successfully produces a response that provides the feminine form of the translation. In a second case, the language model 606 provides a result that conveys its failure to successfully produce the feminine form of the translation. The language model 606 may fail because it determines that there is no feminine form of the translation for any reason, and/or it concludes that it has insufficient evidence to produce the feminine form. For instance, the audio signal for "I am happy" may be sent to the language model 606 because it has a first-person pronoun, but the word for "happy" in Spanish ("feliz") is gender neutral.

A gender detection component 608 detects the gender of the speaker based on analysis of the first-person audio signal. In some implementations, the gender detection component 608 includes a feature extraction component that produces the type of feature information described above (including any of MFCCs, pitch information, etc.). The gender detection component 608 uses any machine-trained classification model or engine to transform the feature information to a classification result that identifies the most likely gender of the speaker. Illustrative machine-trained models that are capable of performing this task include feed-forward neural networks, convolutional neural networks, transformer-based networks, and so on. The gender detection component 608 is trained in a preliminary process by iteratively reducing differences between model-generated gender detection results and ground-truth detection results, e.g., using a cross entropy loss function. The gender classification component 522 of FIG. 5 is trainable in the same manner.

An example set formation component 610 ("formation component" for brevity) produces a converted training example that includes a set of transcripts for different possible speaker and translation form pairings. In a first case, assume that the gender bias detection component 602 has detected bias and the language model 606 successfully produces the missing translation (e.g., the translation in the feminine form). As an outcome of this conclusion, the formulation component 610 produces: a male-masculine textual transcript that uses a masculine form for a state in which the audio signal has male characteristics; a male-feminine textual transcript that uses a feminine form for a state in which the audio signal has male characteristics; a female-feminine textual transcript that uses the feminine form for a state in which the audio signal has female characteristics; and a female-masculine textual transcript that uses the masculine form for a state in which the audio signal has female characteristics. In the case in which the original example exhibits a default bias towards male translations, the formulation component 618 receives the feminine form from the language model 606. The formulation component 618 accepts the original translation provided in the data store 504 as the masculine form.

Next consider the case in which the gender bias detection component 602 or the language model 606 concludes that the training example under consideration is unlikely to exhibit gender bias. For this case, the formulation component 610 produces: a male-neutral textual transcript that uses a gender-neutral form for a state in which the audio signal has male characteristics; and a female-neutral textual transcript that uses a gender-neutral form for a state in which the audio signal has female characteristics.

In conclusion, the conversion system 506 relies on the language model 606 to expand an original training example to include counterpart translations in an alternative form (in the above example, the feminine form). The preliminary gender bias detection component 602 helps filter out the training examples that are unlikely to suffer from gender bias, which has the end result of reducing the number of resource-intensive and latency-incurring calls to the language model 606. The formation component 610 produces all possible pairings of speaker audio characteristics and translation forms. The training system 510 of FIG. 5 relies on this expanded set to train the machine-trained model 512 for different input scenarios. The machine-trained model 512 that is produced as a result of the training is able to produce accurate translations in different translation modes, with a reduced occurrence of gender-related errors, because it has been trained on a robust training corpus that is improved in the above-described manner by the conversion system 506.

In other implementations, the conversion system 506 relies on the language model 606 to more generally produce a translation that is based on an opposite gender assumption than that which is exhibited by the original second-language transcript. For example, assume that the gender bias detection component 602 concludes that the training example under consideration is capable of gender bias and the second-language transcript is already in the feminine form. The language model 606 will produce a variation of the original translation in the masculine form. This allows the formation component 610 to populate the transcripts in the converted training example that pertain to the masculine translation form.

FIG. 8 shows an illustrative prompt 702 produced by the prompt-generating component 604. The prompt includes a first part 704 that describes the task that the language model 606 is being asked to perform, a second part 706 that provides one or more examples of how to correctly perform the task, and a third part 708 that provides a description of one or more training examples under consideration (e.g., by providing the first-language transcript and/or the second-language transcript). For example, the third part describes a sequence of training examples produced by different kinds of speakers.

In one example, the first part 704 describes the task using the following illustrative statements. "You are an AI assistant that can minimally change the Spanish sentence to conform to a female speaker gender without affecting the gender of any instance of second-person/third-person in the Spanish sentence. Individual sentences are separated by ||." "Each of the Spanish sentences may contain gender-specific words including any of adjectives, nouns, pronouns, articles, verbs etc. that can help you determine the gender of the speaker and the gender of any second-person/third-person expressed in the sentence." "If the detected gender of the speaker is male, you should change the minimum number of words in the Spanish sentence to make the gender of the speaker female without (and this is important) changing the words that determine the gender of any second-person/third-person." "If the detected gender of the speaker is female or the sentence is gender neutral or the sentence makes reference to group of speakers or if changing the sentence would result in incorrect Spanish grammar, the sentence should remain unchanged." "You should update each Spanish sentence and return it in the 'updated' key, again separated by ||. Don't return any other key or comments/suggestions."

FIGS. 8-10 show processes that represent an overview of the operation of the speech-processing system 102 of FIGS. 1 and 2, and the training framework 132 of FIGS. 5-7. Each of the processes is expressed as a series of operations performed in a particular order. But the order of these operations is merely representative, and the operations are capable of being varied in other implementations. Further, any two or more operations described below are capable of being performed in a parallel manner. In one implementation, the blocks shown in the processes that pertain to processing-related functions are implemented by the computing equipment described in connection with FIGS. 11 and 12.

More specifically, FIG. 8 shows a process 802 for translating speech. In block 804, the speech-processing system 102 receives an audio signal from an audio signal source that captures speech in a first language. In block 806, the speech-processing system 102 receives a gender preference signal that identifies a translation mode selected from among a set of translation modes. In block 808, the speech-processing system 102 produces feature information based on the audio signal and the gender preference signal. In block 810, the speech-processing system 102 converts the feature information into a translation of the speech in the audio signal in a second language that is different than the first language using a machine-trained model (e.g., the machine-trained model 122). In block 812, the speech-processing system 102 generates output information that includes the translation. The machine-trained model includes machine-trained parameters that are capable of producing translations in the different translation modes, including: a first translation mode for producing first translations in masculine form irrespective of characteristics of audio signals; a second translation mode for producing second translations in feminine form irrespective of characteristics of the audio signals, and a third translation mode for producing a mix of masculine and feminine forms based on the characteristics of the audio signals.

FIG. 9 shows a process 902 performed by the training framework 132 for training a machine-trained model (e.g., the machine-trained model 122). In block 904, the training framework 132 produces feature information associated with an audio signal that includes speech in a first language. In block 906, the training framework 132 converts the feature information into a model-generated second-language textual transcript using a machine-trained model, the model-generated second-language textual transcript being expressed in a second language that is different than the first language. In block 908, the training framework 132 compares the model-generated second-language textual transcript with a ground-truth second-language textual transcript, to produce a translation loss. In block 910, the training framework 132 converts the feature information associated with the audio signal into a model-generated input gender. In block 912, the training framework 132 compares the model-generated input gender with a ground-truth input gender, to produce a gender loss. In block 914, the training framework 132 updates parameters of the machine-trained model based on a combination of the translation loss and gender loss.

FIG. 10 shows another process 1002 performed by the training framework 132 for training a machine-trained model (e.g., the machine-trained model 122). In block 1004, the training framework 132 receives original training examples that include audio signals containing speech in a first language, first-language textual transcripts of the audio signals, and second-language textual transcripts of translations of the audio signals in a second language that is different than the first language. In block 1006, the training framework 132 produces converted training examples by correcting instances of gender bias in the second-language textual transcripts, the instances of gender bias having second-language transcripts having gender forms that do not match audio characteristics of associated audio signals. The block 1008, the training framework 132 trains parameters of the machine-trained model based on the converted training examples.

FIG. 11 shows computing equipment 1102 that, in some implementations, is used to implement the speech-processing system 102 of FIGS. 1 and 2 and the training framework 132 of FIGS. 5-7. The computing equipment 1102 includes a set of local devices 1104 coupled to a set of servers 1106 via a computer network 1108. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, a media device, a vehicle-borne computing system, any type of robot computing system, etc. In some implementations, the computer network 1108 is implemented as a local area network, a wide area network (e.g., the Internet), one or more point-to-point links, or any combination thereof.

The bottom-most overlapping box in FIG. 11 indicates that the functionality of the speech-processing system 102 and the training framework 132 is capable of being spread across the local devices 1104 and/or the servers 1106 in any manner. In one example, the speech-processing system 102 and/or the training framework 132 are entirely implemented by a local device. In another example, the functions of the speech-processing system 102 and/or the training framework 132 are entirely implemented by the servers 1106. Here, a user is able to interact with the servers 1106 via a browser application running on a local device. In other examples, some of the functions of the speech-processing system 102 and/or the training framework 132 are implemented by a local device, and other functions of the speech-processing system 102 and/or training framework 132 are implemented by the servers 1106. In some implementations, for instance, the language model 606 is implemented by the servers 1106, and the remainder of the functions of the training framework 132 are implemented by each local device.

FIG. 12 shows a computing system 1202 that, in some implementations, is used to implement any aspect of the mechanisms set forth in the above-described figures. For instance, in some implementations, the type of computing system 1202 shown in FIG. 12 is used to implement any local computing device or any server shown in FIG. 11. In all cases, the computing system 1202 represents a physical and tangible processing mechanism.

The computing system 1202 includes a processing system 1204 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1202 also includes computer-readable storage media 1206, corresponding to one or more computer-readable media hardware units. The computer-readable storage media 1206 retains any kind of information 1208, such as machine-readable instructions, settings, model weights, and/or other data. In some implementations, the computer-readable storage media 1206 includes one or more solid-state devices, one or more hard disks, one or more optical disks, etc. Any instance of the computer-readable storage media 1206 uses any technology for storing and retrieving information. Further, any instance of the computer-readable storage media 1206 represents a fixed or removable unit of the computing system 1202. Further, any instance of the computer-readable storage media 1206 provides volatile and/or non-volatile retention of information. The specific term "computer-readable storage medium" or "storage device" expressly excludes propagated signals per se in transit; a computer-readable storage medium or storage device is "non-transitory" in this regard.

The computing system 1202 utilizes any instance of the computer-readable storage media 1206 in different ways. For example, in some implementations, any instance of the computer-readable storage media 1206 represents a hardware memory unit (such as random access memory (RAM)) for storing information during execution of a program by the computing system 1202, and/or a hardware storage unit (such as a hard disk) for retaining/archiving information on a more permanent basis. In the latter case, the computing system 1202 also includes one or more drive mechanisms 1210 (such as a hard drive mechanism) for storing and retrieving information from an instance of the computer-readable storage media 1206.

In some implementations, the computing system 1202 performs any of the functions described above when the processing system 1204 executes computer-readable instructions stored in any instance of the computer-readable storage media 1206. For instance, in some implementations, the computing system 1202 carries out computer-readable instructions to perform each block of the processes described with reference to FIGS. 8-10. FIG. 12 generally indicates that hardware logic circuitry 1212 includes any combination of the processing system 1204 and the computer-readable storage media 1206.

In addition, or alternatively, the processing system 1204 includes one or more other configurable logic units that perform operations using a collection of logic gates. For instance, in some implementations, the processing system 1204 includes a fixed configuration of hardware logic gates, e.g., that are created and set at the time of manufacture, and thereafter unalterable. In addition, or alternatively, the processing system 1204 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1204 effectively incorporates a storage device that stores computer-readable instructions, insofar as the configurable logic units are configured to execute the instructions and therefore embody or store these instructions.

In some cases (e.g., in the case in which the computing system 1202 represents a user computing device), the computing system 1202 also includes an input/output interface 1214 for receiving various inputs (via input devices 1216), and for providing various outputs (via output devices 1218). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1220 and an associated graphical user interface presentation (GUI) 1222. The display device 1220 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1202 also includes one or more network interfaces 1224 for exchanging data with other devices via one or more communication conduits 1226. One or more communication buses 1228 communicatively couple the above-described units together.

The communication conduit(s) 1226 is implemented in any manner, e.g., by a local area computer network, a wide area computer network (e.g., the Internet), point-to-point connections, or any combination thereof. The communication conduit(s) 1226 include any combination of hardwired links, wireless links, routers, gateway functionality, name servers, etc., governed by any protocol or combination of protocols.

FIG. 12 shows the computing system 1202 as being composed of a discrete collection of separate units. In some cases, the collection of units corresponds to discrete hardware units provided in a computing device chassis having any form factor. FIG. 12 shows illustrative form factors in its bottom portion. In other cases, the computing system 1202 includes a hardware logic unit that integrates the functions of two or more of the units shown in FIG. 12. For instance, in some implementations, the computing system 1202 includes a system on a chip (SoC or SOC), corresponding to an integrated circuit that combines the functions of two or more of the units shown in FIG. 12.

The following summary provides a set of illustrative examples of the technology set forth herein.

(A1) According to one aspect, a method (e.g., the process 1002) is described for training a machine-trained model (e.g., the machine-trained model 122) for use in translating speech. The method includes: receiving (e.g., in block 1004) original training examples that include audio signals containing speech in a first language, first-language textual transcripts of the audio signals, and second-language textual transcripts of translations of the audio signals in a second language that is different than the first language; producing (e.g., in block 1006) converted training examples by correcting instances of gender bias in the second-language textual transcripts, the instances of gender bias having second-language transcripts having gender forms that do not match audio characteristics of associated audio signals; and training (e.g., in block 1008) parameters of a machine-trained model based on the converted training examples.

(A2) According to some implementations of the method of A1, the producing converted training examples includes, for a particular original training example that includes an audio signal, a first-language textual transcript, and a second-language textual transcript that conveys an original translation of the audio signal: determining that the first-language textual transcript and/or the second-language textual transcript includes a characteristic that renders the particular first training example capable of gender bias; generating a modified translation using a machine-trained language model based on a gender assumption that is different than a gender assumption that is used to produce the original translation; detecting a gender associated with the audio signal; and producing a converted training example based on the modified translation and the gender that is detected.

(A3) According to some implementations of the method of A2, the determining concludes that the first-language textual transcript and/or the second-language textual transcript is capable of gender bias because the first-language textual transcript and/or the second-language textual transcript includes a first-person pronoun.

(A4) According to some implementations of the methods of A2 or A3, the determining concludes that the first-language textual transcript and/or the second-language textual transcript is capable of gender bias based on analysis performed by the machine-trained language model or another machine-trained language model.

(A5) According to some implementations of any of methods of A2-A4, the converted training example includes a set of second-language textual transcripts, including: a male-masculine textual transcript that uses a masculine form for a state in which the audio signal has male characteristics; a male-feminine textual transcript that uses a feminine form for a state in which the audio signal has male characteristics; a female-feminine textual transcript that uses the feminine form for a state in which the audio signal has the female characteristics; and a female-masculine textual transcript that uses the masculine form for a state in which the audio signal has the female characteristics.

(A6) According to some implementations of any of methods of A1-A5, the producing converted training examples includes, for a particular original training example that includes an audio signal that expresses speech in the first language, a first-language textual transcript, and a second-language textual transcript that conveys an original translation of the audio signal: determining that the first-language textual transcript and/or second-language textual transcript has a characteristic that indicates that the particular first training example is free of gender bias; and producing a converted training example that includes a male-neutral textual transcript that uses a gender-neutral form for a state in which the audio signal has male characteristics, and a female-neutral textual transcript that uses a gender-neutral form for a state in which the audio signal has female characteristics.

(A7) According to some implementations of any of methods of A1-A6, the training of the parameters of the machine-trained model comprises, for a particular converted training example having an audio signal that expresses speech in the first language, a ground-truth second-language textual transcript, and a ground-truth input gender: producing feature information associated with the audio signal; converting the feature information into a model-generated second-language textual transcript using the machine-trained model; comparing the model-generated second-language textual transcript with the ground-truth second-language textual transcript, to produce a translation loss; converting the feature information associated with the audio signal into a model-generated input gender; comparing the model-generated input gender with the ground-truth input gender, to produce a gender loss; and updating the parameters of the machine-trained model based on a combination of the translation loss and gender loss.

(A8) According to some implementations of the method of A7, the machine-trained model includes an encoder for producing encoder output information, and a decoder for producing decoder output information based on the encoder output information, and the translation loss is produced based on the decoder output information, and the gender loss is produced based on the encoder output information.

(A9) According to some implementations of the method of A8, the gender loss is produced by a machine-trained classification model that operates on the encoder output information.

(A10) According to some implementations of any of methods of A1-A9, the training of the parameters of the machine-trained model comprises, for a particular converted training example having an audio signal and a gender preference signal that identifies a translation mode selected from among a set of translation modes: producing feature information based on the audio signal and the gender preference signal; and converting the feature information into a second-language textual transcript using the machine-trained model, the parameters of the machine-trained model being capable of producing translations in the different translation modes, including: a first translation mode for producing first translations in masculine form irrespective of characteristics of audio signals that are input to the machine-trained model; a second translation mode for producing second translations in feminine form irrespective of characteristics of the audio signals, and a third translation mode for producing a mix of masculine and feminine forms based on the characteristics of the audio signals.

(A11) According to some implementations of the method of A10, the training of the parameters of the machine-trained model comprises processing a sequence of converted training examples that are associated with different translation modes.

(A12) According to some implementations of any of the methods of A1-A11, a translation system that uses the machine-trained model operates on an input audio signal obtained from a microphone that captures real-time audio signals from speech, or a media item that includes the audio signals as one component thereof.

(A13) According to some implementations of any of the methods of A1-A12, a translation system that uses the machine-trained model produces output information that includes a modified media item that provides a second-language textual transcript of a translation produced by the machine-trained model as a caption to visual information.

(A14) According to some implementations of the method of A10, the feature information includes plural frames of feature information, each frame having first feature information that expresses the audio signal combined with second feature information that expresses the gender preference signal.

(B1) According to another aspect, a method (e.g., the process 802) is described for training a machine-trained model (e.g., the machine-trained model 122) for translating speech. The method includes: receiving (e.g., in block 804) an audio signal from an audio signal source that captures speech in a first language; receiving (e.g., in block 806) a gender preference signal that identifies a translation mode selected from among a set of translation modes; producing (e.g., in block 808) feature information based on the audio signal and the gender preference signal; converting (e.g., in block 810) the feature information into a translation of the speech in the audio signal in a second language that is different than the first language using a machine-trained model; and generating (e.g., in block 812) output information that includes the translation. The machine-trained model includes machine-trained parameters that are capable of producing translations in the different translation modes, including: a first translation mode for producing first translations in masculine form irrespective of characteristics of audio signals; a second translation mode for producing second translations in feminine form irrespective of characteristics of the audio signals, and a third translation mode for producing a mix of masculine and feminine forms based on the characteristics of the audio signals.

(B2) According to some implementations of the method of B1, the audio signal source is a microphone that captures real-time audio signals from speech, or a media item that includes the audio signals as one component thereof.

(B3) According to some implementations of the methods of B1 or B2, the output information includes a modified media item that provides a second-language textual transcript of the translation as a caption to visual information.

(B4) According to some implementations of any of the methods of B1-B3, the feature information includes plural frames of feature information, each frame having first feature information that expresses the audio signal combined with second feature information that expresses the gender preference signal.

(B5) According to some implementations of any of the methods of B1-B4, the parameters of the machine-trained model are produced by minimizing loss that is a combination of translation loss that expresses accuracy at which the machine-trained model produces translations, and gender loss that expresses accuracy at which the machine-trained model detects a gender associated with a particular audio signal that has been received in the third translation mode.

(C1) According to another aspect, a method (e.g., the process 902) is described for training a machine-trained model (e.g., the machine-trained model 122) for translating speech. The method includes: producing (e.g., in block 904) feature information associated with an audio signal that includes speech in a first language; converting (e.g., in block 906) the feature information into a model-generated second-language textual transcript using the machine-trained model, the model-generated second-language textual transcript being expressed in a second language that is different than the first language; comparing (e.g., in block 908) the model-generated second-language textual transcript with a ground-truth second-language textual transcript, to produce a translation loss; converting (e.g., in block 910) the feature information associated with the audio signal into a model-generated input gender; comparing (e.g., in block 912) the model-generated input gender with a ground-truth input gender, to produce a gender loss; and updating (e.g., in block 914) parameters of the machine-trained model based on a combination of the translation loss and gender loss.

(C2) According to some implementations of the method of C1, the machine-trained model includes an encoder for producing encoder output information, and a decoder for producing decoder output information based on the encoder output information. The translation loss is produced based on the decoder output information, and the gender loss is produced based on the encoder output information.

(C3) According to some implementations of the method of C2, the gender loss is produced by a machine-trained classification model that operates on the encoder output information.

(C4) According to some implementations of any of the methods of C1-C3, the feature information includes first feature information that expresses the audio signal combined with second feature information that expresses a gender preference signal.

In yet another aspect, some implementations of the technology described herein include a computing system (e.g., the computing system 1202) that includes a processing system (e.g., the processing system 1204) having a processor. The computing system also includes a storage device (e.g., the computer-readable storage media 1206) for storing computer-readable instructions (e.g., the information 1208). The processing system executes the computer-readable instructions to perform any of the methods described herein (e.g., any individual method of the methods of A1-A14, B1-B5, and C1-C4).

In yet another aspect, some implementations of the technology described herein include a computer-readable storage medium (e.g., the computer-readable storage media 1206) for storing computer-readable instructions (e.g., the information 1208). A processing system (e.g., the processing system 1204) executes the computer-readable instructions to perform any of the operations described herein (e.g., the operations in any individual method of the methods of A1-A14, B1-B5, and C1-C4).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the phrase "configured to" encompasses various physical and tangible mechanisms for performing an identified operation. The mechanisms are configurable to perform an operation using the hardware logic circuitry 1212 of FIG. 12. The term "logic" likewise encompasses various physical and tangible mechanisms for performing a task. For instance, each processing-related operation illustrated in the flowcharts of FIGS. 8-10 corresponds to a logic component for performing that operation.

Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. The term "prescribed" is used to designate that something is purposely chosen according to any environment-specific considerations. For instance, a threshold value or state is said to be prescribed insofar as it is purposely chosen to achieve a desired result. "Environment-specific" means that a state is chosen for use in a particular environment. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for training a machine-trained model for translating speech comprising:

receiving original training examples that include audio signals containing speech in a first language by speakers, first-language textual transcripts of the audio signals, and second-language textual transcripts of translations of the audio signals in a second language that is different than the first language;

producing converted training examples by detecting and then correcting instances of gender bias in the second-language textual transcripts, the instances of gender bias having second-language transcripts having gender forms that do not match audio characteristics of associated audio signals and genders of the speakers; and training parameters of the machine-trained model, based on the converted training examples, by minimizing loss that is a combination of translation loss that expresses accuracy at which the machine-trained model produces translations, and gender loss that expresses accuracy at which the machine-trained model detects a gender.

2. The method of claim 1, wherein the producing converted training examples includes, for a particular original training example that includes an audio signal, a first-language textual transcript, and a second-language textual transcript that conveys an original translation of the audio signal:

determining that the first-language textual transcript and/or the second-language textual transcript includes a characteristic that renders the particular first training example capable of gender bias;

generating a modified translation using a machine-trained language model based on a gender assumption that is different than a gender assumption that is used to produce the original translation;

detecting a gender associated with the audio signal; and producing a converted training example based on the modified translation and the gender that is detected.

3. The method of claim 2, wherein the determining concludes that the first-language textual transcript and/or the second-language textual transcript is capable of gender bias because the first-language textual transcript and/or the second-language textual transcript includes a first-person pronoun.

4. The method of claim 2, wherein the determining concludes that the first-language textual transcript and/or the second-language textual transcript is capable of gender bias based on analysis performed by the machine-trained language model or another machine-trained language model.

5. The method of claim 2, wherein the converted training example includes a set of second-language textual transcripts, including:

a male-masculine textual transcript that uses a masculine form for a state in which the audio signal has male characteristics;

a male-feminine textual transcript that uses a feminine form for a state in which the audio signal has male characteristics;

a female-feminine textual transcript that uses the feminine form for a state in which the audio signal has the female characteristics; and a female-masculine textual transcript that uses the masculine form for a state in which the audio signal has the female characteristics.

6. The method of claim 1, wherein the producing converted training examples includes, for a particular original training example that includes an audio signal that expresses speech in the first language, a first-language textual transcript, and a second-language textual transcript that conveys an original translation of the audio signal:

determining that the first-language textual transcript and/or second-language textual transcript has a characteristic that indicates that the particular first training example is free of gender bias; and producing a converted training example that includes:

a male-neutral textual transcript that uses a gender-neutral form for a state in which the audio signal has male characteristics; and a female-neutral textual transcript that uses a gender-neutral form for a state in which the audio signal has female characteristics.

7. The method of claim 1, wherein the training of the parameters of the machine-trained model comprises, for a particular converted training example having an audio signal that expresses speech in the first language, a ground-truth second-language textual transcript, and a ground-truth input gender:

producing feature information associated with the audio signal;

converting the feature information into a model-generated second-language textual transcript using the machine-trained model;

comparing the model-generated second-language textual transcript with the ground-truth second-language textual transcript, to produce an instance of the translation loss;

converting the feature information associated with the audio signal into a model-generated input gender;

comparing the model-generated input gender with the ground-truth input gender, to produce an instance of the gender loss; and updating the parameters of the machine-trained model based on a combination of the translation loss and gender loss.

8. The method of claim 1, wherein the machine-trained model includes an encoder for producing encoder output information, and a decoder for producing decoder output information based on the encoder output information, and wherein the translation loss is produced based on the decoder output information, and the gender loss is produced based on the encoder output information.

9. The method of claim 8, wherein the gender loss is produced by a machine-trained classification model that operates on the encoder output information.

10. The method of claim 1, wherein the training of the parameters of the machine-trained model comprises, for a particular converted training example having an audio signal and a gender preference signal that identifies a translation mode selected from among a set of translation modes:

producing feature information based on the audio signal and the gender preference signal; and converting the feature information into a second-language textual transcript using the machine-trained model, the parameters of the machine-trained model being capable of producing translations in the different translation modes, including: a first translation mode for producing first translations in masculine form irrespective of characteristics of audio signals that are input to the machine-trained model; a second translation mode for producing second translations in feminine form irrespective of characteristics of the audio signals, and a third translation mode for producing a mix of masculine and feminine forms based on the characteristics of the audio signals.

11. The method of claim 10, wherein the training of the parameters of the machine-trained model comprises processing a sequence of converted training examples that are associated with different translation modes.

12. A computing system for translating speech, comprising:

an instruction data store for storing computer-readable instructions; and a processing system for executing the computer-readable instructions in the data store, to perform operations including:

receiving an audio signal from an audio signal source that captures speech in a first language;

receiving a gender preference signal that identifies a translation mode selected from among a set of translation modes;

producing feature information based on the audio signal and the gender preference signal;

converting the feature information into a translation of the speech in the audio signal in a second language that is different than the first language using a machine-trained model; and generating output information that includes the translation, the machine-trained model including machine-trained parameters that are capable of producing translations in the different translation modes, including: a first translation mode for producing first translations in masculine form irrespective of characteristics of audio signals; a second translation mode for producing second translations in feminine form irrespective of characteristics of the audio signals, and a third translation mode for producing a mix of masculine and feminine forms based on the characteristics of the audio signals.

13. The computing system of claim 12, wherein the audio signal source is a microphone that captures real-time audio signals from speech, or a media item that includes the audio signals as one component thereof.

14. The computing system of claim 12, wherein the output information includes a modified media item that provides a second-language textual transcript of the translation as a caption to visual information.

15. The computing system of claim 12, wherein the feature information includes plural frames of feature information, each frame having first feature information that expresses the audio signal combined with second feature information that expresses the gender preference signal.

16. The computing system of claim 12, wherein the parameters of the machine-trained model are produced by minimizing loss that is a combination of translation loss that expresses accuracy at which the machine-trained model produces translations, and gender loss that expresses accuracy at which the machine-trained model detects a gender associated with a particular audio signal that has been received in the third translation mode.

17. A computer-readable storage medium for storing computer-readable instructions, a processing system executing the computer-readable instructions to perform operations, the operations comprising:

producing feature information associated with an audio signal that includes speech in a first language;

converting the feature information into a model-generated second-language textual transcript using a machine-trained model, the model-generated second-language textual transcript being expressed in a second language that is different than the first language;

comparing the model-generated second-language textual transcript with a ground-truth second-language textual transcript, to produce a translation loss;

converting the feature information associated with the audio signal into a model-generated input gender;

comparing the model-generated input gender with a ground-truth input gender, to produce a gender loss; and updating parameters of the machine-trained model based on a combination of the translation loss and gender loss.

18. The computer-readable storage medium of claim 17, wherein the machine-trained model includes an encoder for producing encoder output information, and a decoder for producing decoder output information based on the encoder output information, and wherein the translation loss is produced based on the decoder output information, and the gender loss is produced based on the encoder output information.

19. The computer-readable storage medium of claim 18, wherein the gender loss is produced by a machine-trained classification model that operates on the encoder output information.

20. The computer-readable storage medium of claim 17, wherein the feature information includes first feature information that expresses the audio signal combined with second feature information that expresses a gender preference signal.

* * * * *